United States Patent
Lee et al.

(10) Patent No.: US 11,290,382 B2
(45) Date of Patent: Mar. 29, 2022

(54) EFFICIENT POLICY ENFORCEMENT FOR DOWNLINK TRAFFIC USING NETWORK ACCESS TOKENS—CONTROL-PLANE APPROACH

(71) Applicant: QUALCOMM Incorporated, San Diego, CA (US)

(72) Inventors: Soo Bum Lee, San Diego, CA (US); Gavin Bernard Horn, La Jolla, CA (US); John Nasielski, San Diego, CA (US); Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 285 days.

(21) Appl. No.: 16/414,625

(22) Filed: May 16, 2019

(65) Prior Publication Data

US 2019/0273688 A1 Sep. 5, 2019

Related U.S. Application Data

(62) Division of application No. 15/009,188, filed on Jan. 28, 2016, now Pat. No. 10,341,239.

(Continued)

(51) Int. Cl.
*H04L 47/20* (2022.01)
*H04W 48/16* (2009.01)
(Continued)

(52) U.S. Cl.
CPC .............. *H04L 47/20* (2013.01); *H04L 41/50* (2013.01); *H04L 63/20* (2013.01); *H04W 48/16* (2013.01); *H04L 67/146* (2013.01); *H04W 88/16* (2013.01)

(58) Field of Classification Search
CPC ......... H04L 41/50; H04L 47/20; H04L 48/16; H04L 67/146; H04W 48/16; H04W 88/16
See application file for complete search history.

(56) References Cited

U.S. PATENT DOCUMENTS 8,375,430 B2  2/2013  Grewal et al.
9,032,480 B2  5/2015  Mindler et al.
(Continued)

FOREIGN PATENT DOCUMENTS

CN   103609147 A    2/2014
WO   2006045402 A1  5/2006
(Continued)

OTHER PUBLICATIONS

International Search Report and Written Opinion—PCT/US2016/031533—ISA/EPO—dated Dec. 16, 2016.

*Primary Examiner* — Brian P Cox
(74) *Attorney, Agent, or Firm* — Loza & Loza LLP

(57) ABSTRACT

A gateway device detects a trigger associated with a device and, in response, identifies an application service associated with the device, obtains a traffic network policy associated with the application service, and obtains a network access token based on the traffic network policy. The network access token facilitates validating and/or mapping a downlink data packet obtained at the gateway device in user-plane traffic that is destined for the device. The network access token is sent to an entity in control-plane signaling. Subsequently, the gateway device obtains a downlink data packet including the network access token. The gateway device verifies the network access token and/or maps the downlink data packet to the device using data obtained from the network access token. The network access token may be removed from the downlink data packet before the downlink data packet is sent to the device according to the mapping.

18 Claims, 16 Drawing Sheets

Related U.S. Application Data

(60) Provisional application No. 62/165,056, filed on May 21, 2015.

(51) Int. Cl.
  H04L 41/50 (2022.01)
  H04L 29/06 (2006.01)
  *H04W 88/16* (2009.01)
  *H04L 67/146* (2022.01)

(56) References Cited

U.S. PATENT DOCUMENTS

| | | |
|---|---|---|
| 9,124,547 B2 | 9/2015 | Bhanage et al. |
| 9,674,889 B2 | 6/2017 | Yu et al. |
| 10,484,434 B2 | 11/2019 | Gu et al. |
| 2011/0111767 A1 | 5/2011 | Livanos |
| 2011/0128907 A1 | 6/2011 | Kvernvik et al. |
| 2011/0267943 A1 | 11/2011 | Huang et al. |
| 2012/0240211 A1 | 9/2012 | Counterman |
| 2012/0275430 A1 | 11/2012 | Wang et al. |
| 2013/0064104 A1 | 3/2013 | Bekiares et al. |
| 2014/0031069 A1* | 1/2014 | Yang ............... H04W 68/00 455/458 |
| 2015/0019703 A1* | 1/2015 | Ludwig ............ H04L 61/103 709/223 |
| 2015/0045032 A1 | 2/2015 | Tomici et al. |
| 2015/0229677 A1 | 8/2015 | Gu et al. |
| 2015/0271216 A1 | 9/2015 | Mathias et al. |
| 2016/0100326 A1 | 4/2016 | Chandramouli et al. |
| 2016/0112896 A1 | 4/2016 | Karampatsis et al. |
| 2016/0337914 A1 | 11/2016 | Hoffmann |
| 2016/0344635 A1 | 11/2016 | Lee et al. |

FOREIGN PATENT DOCUMENTS

| | | | |
|---|---|---|---|
| WO | 2006094721 A1 | 9/2006 | |
| WO | 2010023646 A2 | 3/2010 | |
| WO | 2010066295 A1 | 6/2010 | |
| WO | 2013017176 A1 | 2/2013 | |
| WO | WO-2013017176 A1 * | 2/2013 | ............ H04W 76/10 |
| WO | 2014090342 A1 | 6/2014 | |
| WO | 2014092626 A1 | 6/2014 | |

* cited by examiner

EFFICIENT POLICY ENFORCEMENT FOR DOWNLINK TRAFFIC USING NETWORK ACCESS TOKENS—CONTROL-PLANE APPROACH

This application is a divisional of and claims the benefit of U.S. Nonprovisional application Ser. No. 15/009,188 filed Jan. 28, 2016, titled Efficient Policy Enforcement For Downlink Traffic Using Network Access Tokens—C-Plane Approach and claims priority to U.S. Provisional Application No. 62/165,056 filed May 21, 2015, titled Efficient Policy Enforcement For Downlink Traffic Using Network Access Tokens—C-Plane Approach, the contents of each are incorporated by reference herein.

FIELD

Aspects described herein relate generally to use of a token for packet validation and/or mapping, and more particularly to derivation, at a gateway device, of a network access token that is sent to an application function associated with an application server in control-plane (C-Plane) signaling, included in a downlink data packet sent to the gateway device from the application server in user-plane (U-Plane) traffic, and used by the gateway device for downlink policy enforcement.

BACKGROUND

In a digital communication network such as a cellular communication network, packets may be exchanged between a device (e.g., a chip component, a client device, a mobile device, a user equipment, a terminal), a radio access network (RAN), a core network, and an application server. The application server may be part of, for example, a packet data network (PDN) (e.g., the Internet) and/or an Internet Protocol (IP) Multimedia Service (IMS) network.

The RAN may be a part of a cellular communication network (e.g., 4G, Long Term Evolution (LTE), LTE-Advanced (LTE-A), and future networks such as 5G). The cellular communication network (also referred to herein as the communication network) may include the RAN and a core network (CN) (e.g., an evolved packet core (EPC)). Packets exchanged between the device, the RAN, and the core network may be exchanged on a control-plane and on a user-plane. The packets may be exchanged in control-plane messages and user-plane messages. Control-plane messages may include control signals (e.g., control signaling, control-plane signaling). User-plane messages may include user data (e.g., user data traffic, data traffic).

Packets traveling in the uplink and downlink directions may be forwarded through bearers (e.g., IP Connectivity Access Network (IP-CAN) bearers), or more generally (e.g., in a cellular communication network where bearers may not be defined or may not be used) may be forwarded in data flows. As known to those of skill in the art, the direction of data flowing toward a device may be referred to as the downlink direction, while the direction of data flowing from the device may be referred to as the uplink direction.

Using the downlink direction for exemplary purposes, downlink Internet Protocol (IP) packets (hereinafter "downlink data packets") flow into a core network from, for example, a PDN (e.g., the Internet). The downlink data packets may enter the core network via a packet data network gateway device (P-GW). The P-GW may be an enforcement point for network policies (e.g., core network policies). The P-GW may enforce network policies (e.g., downlink policies) on the downlink data packets.

The handling of the downlink data packets at the P-GW may require the various downlink data packets to be mapped to various bearers or data flows in the cellular communication network. The various bearers or data flows may support, for example, various different maximum bit rates (MBR) and/or other parameters that may influence QoS.

A present solution for mapping is realized using packet inspections (e.g., deep packet inspections and/or shallow packet inspections), traffic flow templates (TFT), and service data flow (SDF) templates. The present solution is referred to herein as the TFT/SDF approach. In the TFT/SDF approach, a P-GW confirms that the downlink data packets conform to a TFT/SDF template defined for the application service(s) by inspecting the headers of each downlink data packet.

The TFT/SDF approach entails the passage of downlink data packets through a set of packet filters in the SDF templates in order, for example, to map each downlink data packet to a bearer.

FIG. 1 illustrates a role of an service data flow (SDF) template 102 in detecting a downlink part of service data flows (a-f) 104 (e.g., from a stream of downlink data packets 106) and mapping that downlink part to data flows or bearers such as the IP-CAN bearers 108 shown, according to the prior art. Any packet that does not correspond to an SDF template 102 may be delivered to a discard 110 location. FIG. 1 is based on Third Generation Partnership Project (3GPP) technical specification (TS) 23.203, FIG. 6.4.

The SDF template 102 is used in a procedure to validate and map each downlink data packet in the stream of downlink data packets 106. The SDF template 102 is used for filtering. Mapping may be done by a certain function that applies a data packet to a corresponding SDF filter. Then, the SDF filter enforces policies. However, use of the sets of packet filters in the SDF template 102 entails the use of tables and table lookup procedures. Use of such tables and procedures affects efficiency in that the tables take up memory/storage space and execution of the procedures expends processor resources. Additionally, time resources are wasted in that each packet in the stream of downlink data packets 106 must be filtered through one or more filters within each SDF template 102 before any given packet in the stream of downlink data packets 106 is applied to an SDF template 102 that meets all of the requirements of the one or more filters therein.

Using packet inspections (e.g., deep packet inspections and/or shallow packet inspections) and TFT/SDF templates at the P-GW, for example, for access and policy enforcement of downlink traffic, may incur overhead (e.g., processing and memory resources for memory lookup and pattern matching) and adds forwarding latency due to processing delay. Additionally, fine-grain policy control (e.g., per application service) is difficult because additional policy control would incur additional overhead and processing delay. Furthermore, use of TFT/SDF templates is not scalable for sponsored connectivity. For example, an increase in the number of sponsors of different application services (perhaps thousands of new application services in years to come) would mean an increase in the time needed to filter packets through an increased number of templates. This, again, would incur additional overhead and processing delay.

What is desired is a way to improve efficiency in access and policy enforcement for downlink traffic.

SUMMARY

According to an aspect, there is disclosed herein a method that may be operational at a gateway device. The method may include detecting, at the gateway device, a trigger associated with a device. In response to detecting the trigger, the method may continue with identifying an application service associated with the device, obtaining a traffic network policy associated with the application service, obtaining a network access token based on the traffic network policy, and sending the network access token to an entity in control-plane signaling. The network access token may facilitate validating and/or mapping a downlink data packet obtained at the gateway device in user-plane traffic that is destined for the device. According to one example, the gateway device is a packet data network gateway device (P-GW).

According to an aspect, the trigger includes obtaining, at the gateway device, a control-plane message to cause the gateway device to perform one or more of obtaining the traffic network policy associated with an application service, obtaining the network access token based on the traffic network policy, and/or sending the network access token to the entity in control-plane signaling. In one example, the control-plane message includes an explicit command to perform one or more of obtaining the traffic network policy associated with an application service, obtaining the network access token based on the traffic network policy, and/or sending the network access token to the entity in control-plane signaling. In one example, the control-plane message includes an implicit command to perform one or more of obtaining the traffic network policy associated with an application service, obtaining the network access token based on the traffic network policy, and/or sending the network access token to the entity in control-plane signaling. In one example, the control-plane message is associated with one or more of a bearer setup message, a bearer activation message, and/or a bearer modification message. In one example, the control-plane message is a create session request. According to an aspect, the trigger includes obtaining, at the gateway device, a first data packet sent from the device that is destined for the application service.

In one example, the traffic network policy associated with an application service is obtained from a policy and charging rules function (PCRF). The traffic network policy may be defined based on a service level agreement between a mobile network operator and an application service provider, and/or a subscription profile of the device. In one example, the entity is a policy and charging rules function (PCRF) and the network access token is sent to the PCRF in the control-plane signaling. In one example, the entity is an application function, and the network access token is sent to the application function in the control-plane signaling. In one example, the entity is an application function, and the network access token is sent to the application function via a policy and charging rules function (PCRF) in the control-plane signaling.

According to an aspect, the method may further include sending an application identifier (App ID) to the entity in the control-plane signaling. In an example, the App ID identifies one or more of an application server, the application service, and/or an application function associated with the application server and/or the application service. In an aspect, the network access token may be obtained at the gateway device and sent to the entity in control-plane signaling prior to obtaining the downlink data packet at the gateway device in user-plane traffic. In an implementation, the method may further include obtaining, in user-plane traffic, at the gateway device, the downlink data packet including the network access token and performing one or more processes. The one or more processes may include verifying the network access token and mapping the downlink data packet to the device using data obtained from the network access token, or mapping the downlink data packet to the device using data obtained from the network access token. The method may further include removing the network access token from the downlink data packet and sending the downlink data packet to the device according to the mapping. According to an example, verifying the network access token includes obtaining a second network access token based on data obtained from the downlink data packet, and comparing the network access token to the second network access token. In one example, if the network access token and the second network access token are equal, the verification of the network access token is successful. According to an aspect, the second network access token may be based on data obtained from the downlink data packet and the traffic network policy.

A gateway device including a communication circuit adapted to communicate with an application server and a communication network and a processing circuit coupled to the communication circuit are described herein. According to an aspect, the processing circuit may be configured to perform the methods exemplified above. A gateway device configured to perform the methods exemplified above is described herein. Additionally, a non-transitory machine-readable storage medium having one or more instructions stored thereon, which when executed by at least one processor causes the at least one processor to perform the methods exemplified above is also described herein.

According to another aspect, a method, operational at an application server is described herein. The method may include obtaining, at the application server, a network access token linked to a device and linked to an application service. The method may further include creating a downlink data packet destined for the device, mapping the downlink data packet to the network access token, including the network access token in the downlink data packet, and sending the downlink data packet including the network access token to the device via a gateway device in user-plane traffic. According to an aspect, the network access token was obtained in control-plane signaling from the gateway device. In one example, the network access token was obtained at an application function associated with the application server in control-plane signaling from the gateway device. According to one aspect the network access token was obtained at the application function via an interface with a policy and charging rules function (PCRF) associated with the gateway device. In one example, the network access token is further linked to the application server. In an aspect, the application service is hosted on the application server. In one example, the network access token is included in one or more of: an Internet Protocol (IP) header, wherein the IP header is an IP Options Field for IPv4, an Internet Protocol (IP) header, wherein the IP header is an IP extension header for IPv6, a Transmission Control Protocol (TCP) header, a Secure Socket Layer (SSL) header, a Transport Layer Security (TLS) record header, a shim header between an Internet Protocol (IP) header and a Transmission Control Protocol/User Datagram Protocol (TCP/UDP) header, and/or a Hypertext Transfer Protocol (HTTP) header.

An application server including a communication circuit adapted to communicate with a communication network and a processing circuit coupled to the communication circuit are described herein. According to an aspect, the processing circuit may be configured to perform the methods exemplified above. Additionally, an application server configured to perform the methods exemplified above is described herein.

Additionally, a non-transitory machine-readable storage medium having one or more instructions stored thereon, which when executed by at least one processor causes the at least one processor to perform the methods exemplified above is also described herein.

DRAWINGS

FIG. 1 illustrates a role of service data flow (SDF) templates in detecting a downlink part of service data flows and mapping that downlink part to data flows or bearers according to the prior art.

FIG. 2 provides an illustration comparing a present Service Data Flow/Traffic Flow Template (SDF/TFT) approach to an exemplary implementation according to aspects described herein.

DETAILED DESCRIPTION

Figure 1:
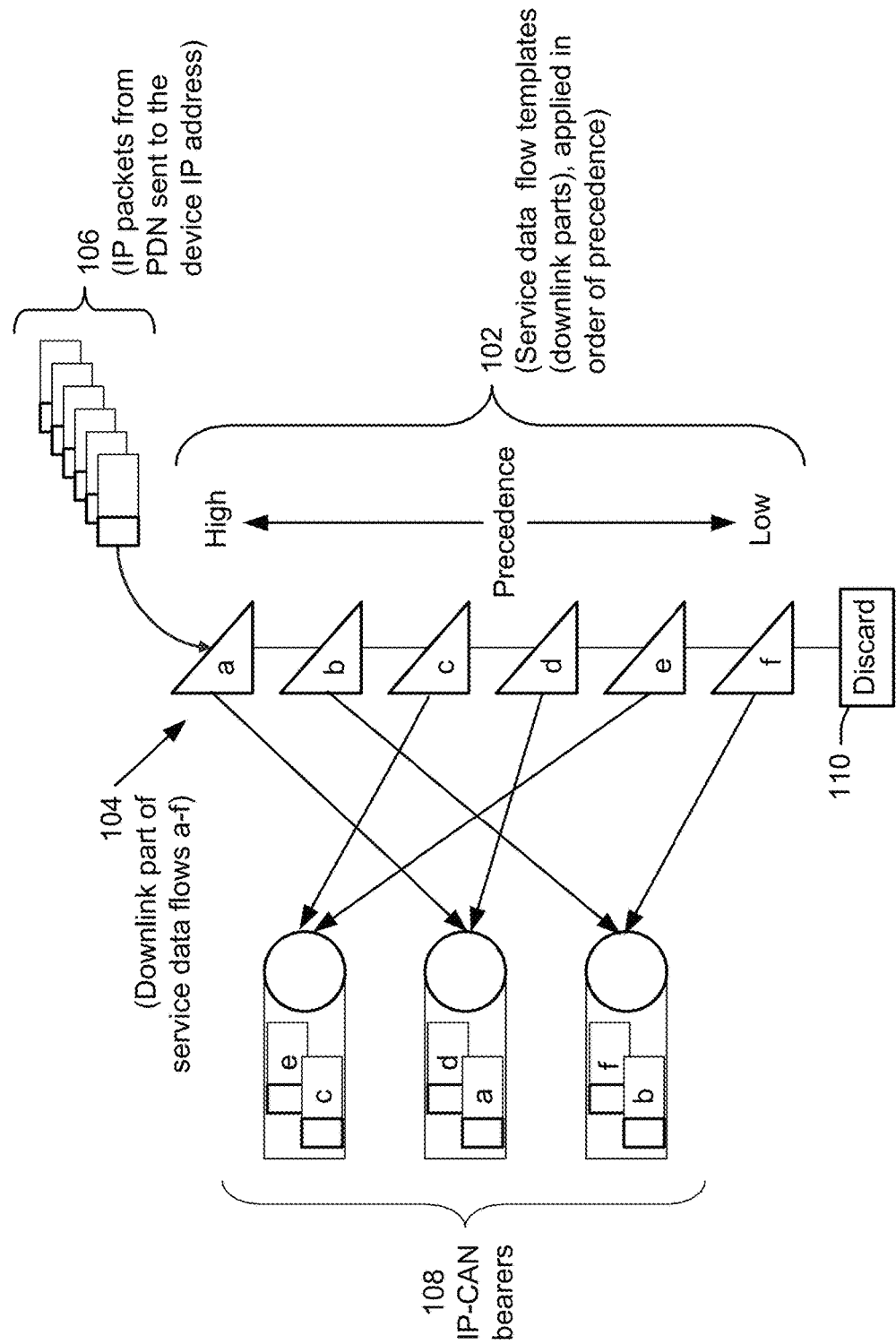

In the following description, reference is made to the accompanying drawings in which is shown, by way of illustration, specific aspects and features described in the disclosure. The aspects and features described in the disclosure are intended to be provided in sufficient detail to enable those skilled in the art to practice the invention. Other aspects and features may be utilized and changes may be made to that which is disclosed without departing from the scope of the disclosure. The following detailed description is not to be taken in a limiting sense, and the scope of the aspects, features, and implementations described and illustrated herein are defined only by the appended claims.

The term "exemplary" is used herein to mean "serving as an example, instance, or illustration." Any aspect, feature, or implementation described herein as "exemplary" is not necessarily to be construed as preferred or advantageous over other aspects, features, or implementations. The term "aspect" does not require that all aspects include the discussed aspect, or any discussed feature, advantage, and/or mode of operation. The term "obtain" is used herein to mean derive, generate, compute, request, receive, acquire, accept, procure, take, collect, get, take delivery or receipt of, be given, gain access to, come into possession of, etc. The term "obtain" as used herein encompasses obtaining locally, and/or obtaining from a non-local or remote entity (e.g., device, server, policy and charging rules function (PCRF), application function (AF), node). The term "obtain" as used herein encompasses obtaining partially and/or obtaining completely. The term "device" is used herein to refer to a chip component, client device, wireless device, mobile device, mobile phone, mobile communication device, mobile computing device, digital tablet, smart phone, user equipment, user device, user terminal, access terminal, and/or terminal, among other devices. The term "send" is used herein to mean provision, transmit, forward, provide, supply, to cause to be conveyed to a destination.

As used herein, a "network access token" may be a token such as a cryptographic token. As used herein, a "network access token" may be referred to as a "network access token", a "downlink (DL) token", or a "DL token".

As used herein, an "application function" may be a control-plane entity (e.g., an entity having functionality in the control-plane). The application function may be a part of (e.g., included with, associated with, coupled to) an application server.

As used herein, the "application server" may be a user-plane entity (e.g., an entity having functionality in the user-plane). For example, the application server may be a user-plane entity that creates (e.g., constructs, compiles, forms, assembles) a packet and sends the packet to a device in downlink user-plane traffic. The application server may host one or more applications and/or application services (individually and collectively referred to herein as "application services"). Exemplary application services include one or more types of traffic, for example, streaming video, voice, and data services. A device may subscribe to an application service. As used herein, an "application service" may be any service (e.g., an IP application) provided by an application service provider.

Networks external to a core network of a cellular communication network, such as a packet data network (PDN) (e.g., the Internet) and an IP Multimedia Service (IMS) network may be exemplified herein by reference to the PDN, however, nothing is intended to limit networks external to the core network to PDNs or IMS networks. Furthermore, aspects and features presented herein are exemplary. Nothing is intended to limit any aspect or feature presented herein to use in only a cellular communication network.

Overview

Aspects described herein may provide for a gateway device (e.g., a packet data network (PDN) gateway device (P-GW)) to be triggered to obtain a network access token and to send the network access token to an application function in control-plane signaling. The P-GW may obtain (e.g., derive, generate, compute, request, receive, acquire, accept, procure, take, collect, get, take delivery or receipt of, be given, gain access to, come into possession of) the network access token using a function such as a cryptographic function. The network access token may be linked to a device and/or an application service. The network access token may be sent to the application function via a control-plane entity (e.g., PCRF) in the core network over a control-plane interface (or using control plane messages).

An application server may obtain the network access token from the application function associated with the application server. The application server may create (e.g., construct, compile, form, assemble) a downlink data packet destined for the device. The application server may include (e.g., embed, associate) the network access token with the downlink data packet and send the downlink data packet including the network access token to the device via the P-GW in the user-plane.

The P-GW can validate the downlink data packet (for example, by verifying the network access token included with the downlink data packet) and/or map the downlink data packet to the device or a bearer/service flow established for the device using data obtained from the network access token. The P-GW can send the downlink data packet to the device using the mapping data obtained from the network access token.

In general, for the P-GW to forward/process a downlink data packet that includes a network access token from an application server in the user-plane, the network access token may first be derived by the P-GW, sent to the application function in the control-plane, and obtained by the application server from the application function. The network access token may be duplicated and a duplicate may be included in each downlink data packet sent from the application server to the device.

Comparison of SDF/TFT Approach to an Exemplary Aspect Described Herein

Figure 2:
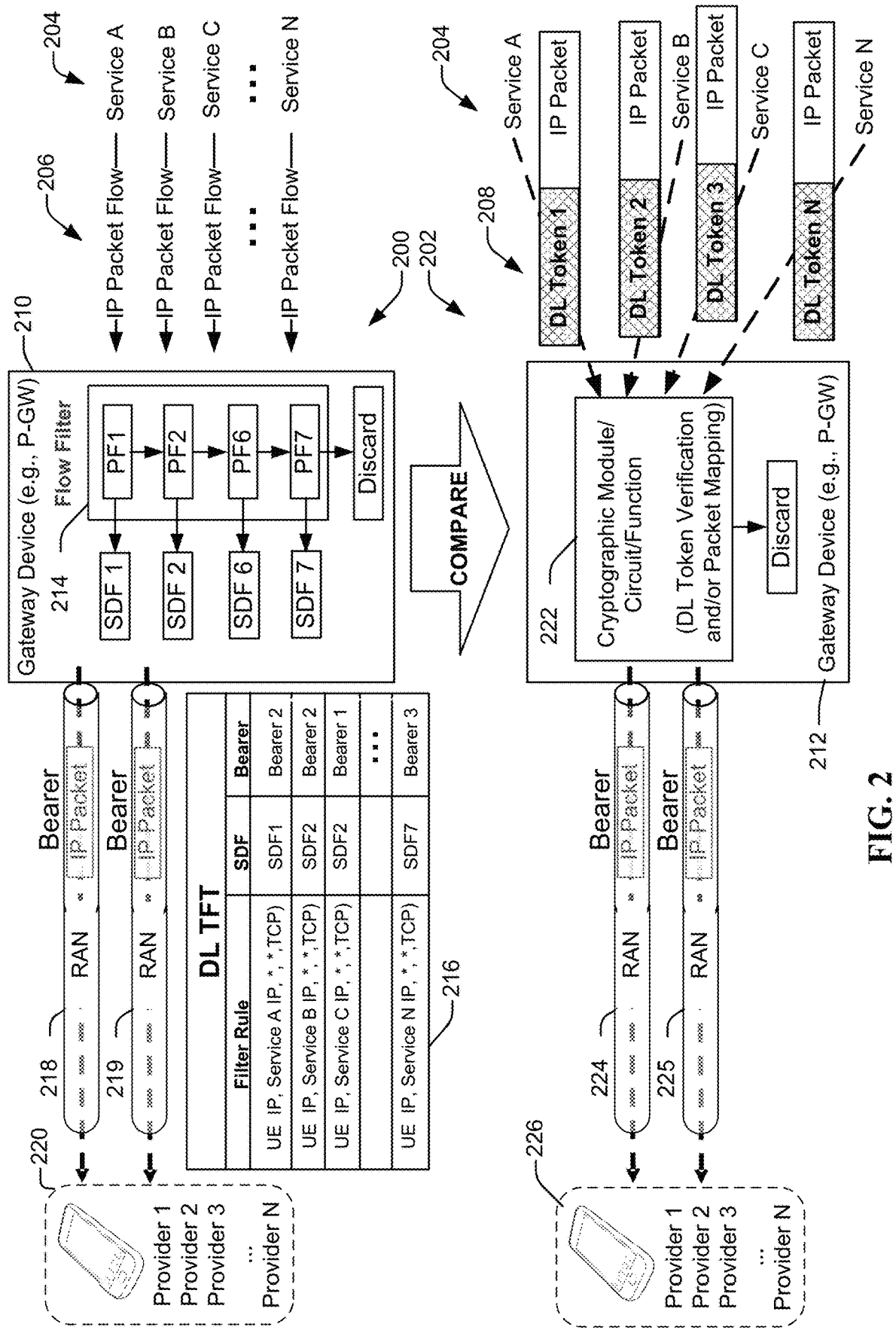

FIG. 2 provides an illustration comparing a present Service Data Flow/Traffic Flow Template (SDF/TFT) approach 200 to an exemplary implementation 202 according to aspects described herein. In the exemplary illustration, Services A-N 204, where N is a positive integer, provide first IP packet flows 206 and second IP packet flows 208 to a first P-GW 210 and a second P-GW 212, respectively. First IP packet flows 206 do not have network access tokens included (e.g., embedded, associated) with each IP packet. Second IP packet flows 208 do have network access tokens (DL tokens) (e.g., DL Token 1, DL Token 2, DL Token 3, . . . , DL Token N) included (e.g., embedded, associated) with each IP packet.

First P-GW 210 utilizes SDF/TFT templates 214 in conjunction with traffic flow template filtering rules 216 to validate and map downlink IP packets to data flows or bearers such as bearer 218 and bearer 219, and ultimately to devices 220. Second P-GW 212 utilizes a cryptographic module/circuit/function 222 to validate and/or map second IP packet flows 208 (e.g., downlink IP packets including network access tokens) to data flows or bearers such as bearer 224 and bearer 225, and ultimately to device 226.

A greater efficiency may be obtained in the processes of validating and/or mapping by replacing, or augmenting, at the P-GW, the use of SDF/TFT templates 214 (and associated tables that include traffic flow template filtering rules 216) and table lookup procedures, with a use of network access tokens as described in the exemplary aspects presented herein.

Validating and/or mapping using network access tokens may be implemented using the cryptographic module/circuit/function 222. A network access token may be used, among other things, to verify the source of a downlink data packet and/or map the downlink data packet to a data flow or a bearer, such as bearer 224 or bearer 225 (e.g., IP-CAN bearers). The network access token may be based on a traffic network policy. The traffic network policy may be based on an application service associated with a device 226. The use of the cryptographic module/circuit/function 222 to supplement/enhance downlink data packet filtering may provide at least the following advantages over the present SDF/TFT method of downlink policy enforcement.

Scalability: No table entries or states need to be kept on a fast-path (or fast-pass) of a processing circuit.

Low latency: A single cryptographic operation (e.g., Hash or Advanced Encryption Standard (AES), whichever runs faster and is appropriate) is sufficient for access control.

Flexibility: a network access token may be constructed based on various meta data. Various policies (e.g., the authenticity/authorization of packets) can be applied to and/or reflected in network access tokens.

Distributed Denial of Service (DDoS) resilience: Efficient filtering of unauthorized downlink traffic by a gateway device (e.g., P-GW) at a border of a network (e.g., before the downlink traffic enters into the core network), for example, by discarding downlink traffic that fails verification (e.g., discarding a downlink data packet whose included network access token failed verification).

Relocatability: Relocating SDF filters can be done via key transfer (e.g., using Network Functions Virtualization (NFV)). Note: a filtering rule (or a set of rules) may be defined by or mapped to a corresponding key.

Exemplary Operating Environment

Figure 3:
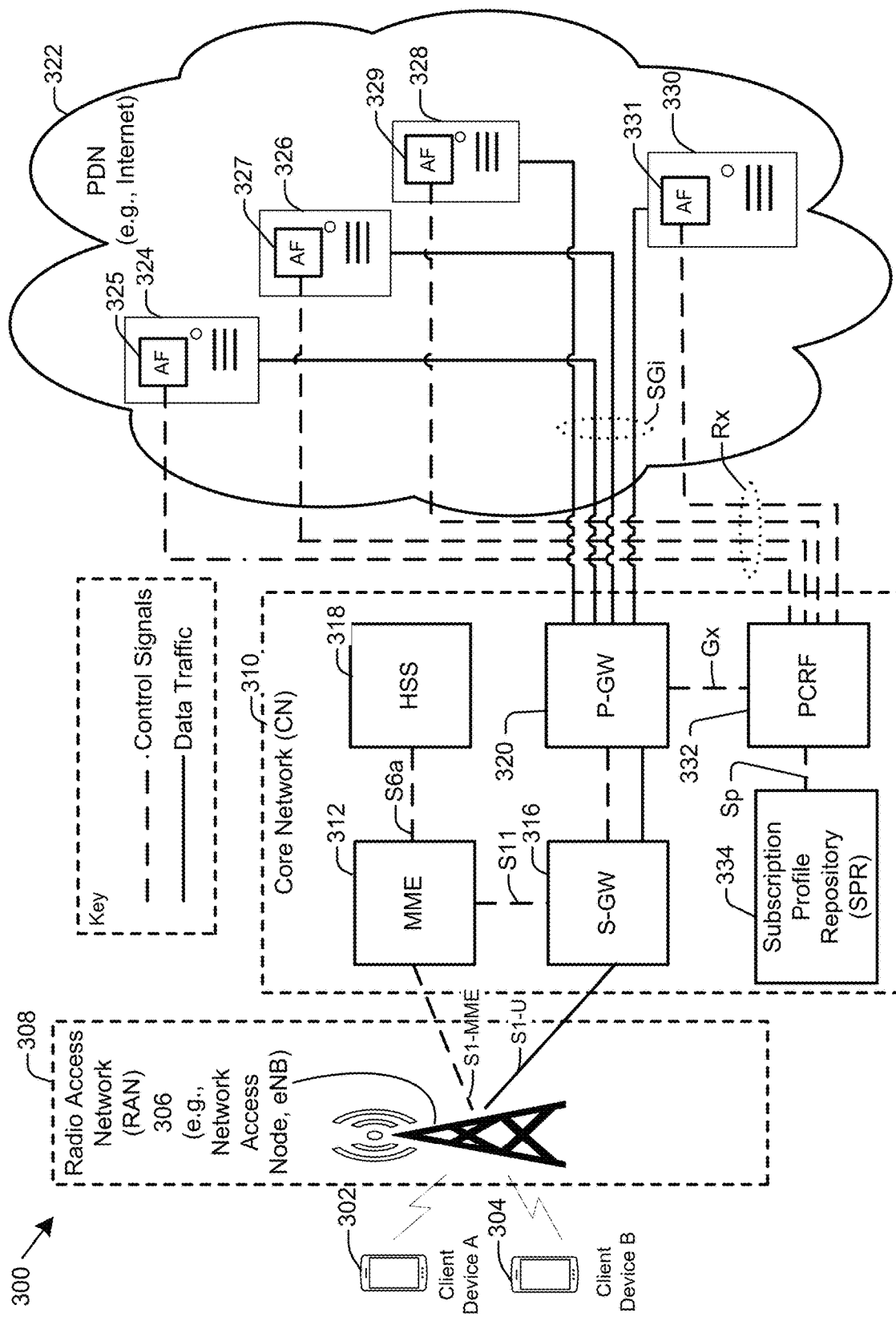
FIG. 3 illustrates an exemplary operating environment in accordance with aspects described herein.

FIG. 3 illustrates an exemplary operating environment 300 in accordance with aspects described herein. In such an exemplary operating environment 300 one or more devices 302, 304 (e.g., client device A, client device B) may communicate wirelessly with an access node 306 (e.g., Node B, eNodeB (eNB), access point (AP)). The access node 306 may be included within a radio access network (RAN) 308 (e.g., enhanced universal terrestrial radio access network (E-UTRAN)). As known to those of skill in the art, the RAN 308 may include more than one access node 306. FIG. 3 illustrates only one access node 306 to reduce clutter.

In a non-limiting example of a cellular communication network (e.g., 4G, LTE, LTE-A), control signals and data traffic may be communicated between the RAN 308 and a core network (CN) 310 (e.g., an evolved packet core (EPC)). Control signals may be communicated via an S1-MME interface. Data traffic may be communicated via an S1-U interface.

In the illustration of FIG. 3, broken lines represent control signaling paths, solid lines represent data traffic paths. A control-plane conveys control signals (e.g., control-plane signaling). A user-plane conveys user data (e.g., user-plane messages).

A CN 310 may include a mobility management entity (MME) 312, a serving gateway device (S-GW) 316, a home subscriber server (HSS) 318, a packet data network gateway device (P-GW) 320, and a policy and charging rules function (PCRF) 332. The PCRF 332 may be coupled to a subscription profile repository (SPR) 334. The PCRF 332 may also be coupled to one or more application functions such as AF 325, AF 327, AF 329, AF 331. Application functions such as AF 325, AF 327, AF 329, AF 331 may be associated with or included with corresponding applications and/or application services hosted on one or more application servers.

The P-GW 320 may communicate in the user-plane with a packet data network (PDN) 322 (e.g., the Internet). More specifically, the P-GW 320 may communicate in the user-plane with servers such as application servers 324, 326, 328, 330. Communication between the P-GW 320 and application servers such as application servers 324, 326, 328, 330 may be conducted via an SGi interface in the user-plane. The PCRF 332 may communicate in the control-plane with application functions such as AF 325, AF 327, AF 329, AF 331. Communication between the PCRF 332 and application functions such as AF 325, AF 327, AF 329, AF 331 may be conducted via an Rx interface. The application servers 324, 326, 328, 330 may be associated with service providers, such as, for example, service providers that provide sales services, information services, streaming video services, and social media services. The application servers 324, 326, 328, 330 may host applications and/or application services. The application servers 324, 326, 328, 330 may include or be associated with one or more application functions such as AF 325, AF 327, AF 329, AF 331.

Each of the application servers 324, 326, 328, 330 may be considered as a user-plane (or data-plane) entity, while each of the application functions such as AF 325, AF 327, AF 329, AF 331 may be considered as a control-plane (or signaling-plane) entity.

Figure 4:
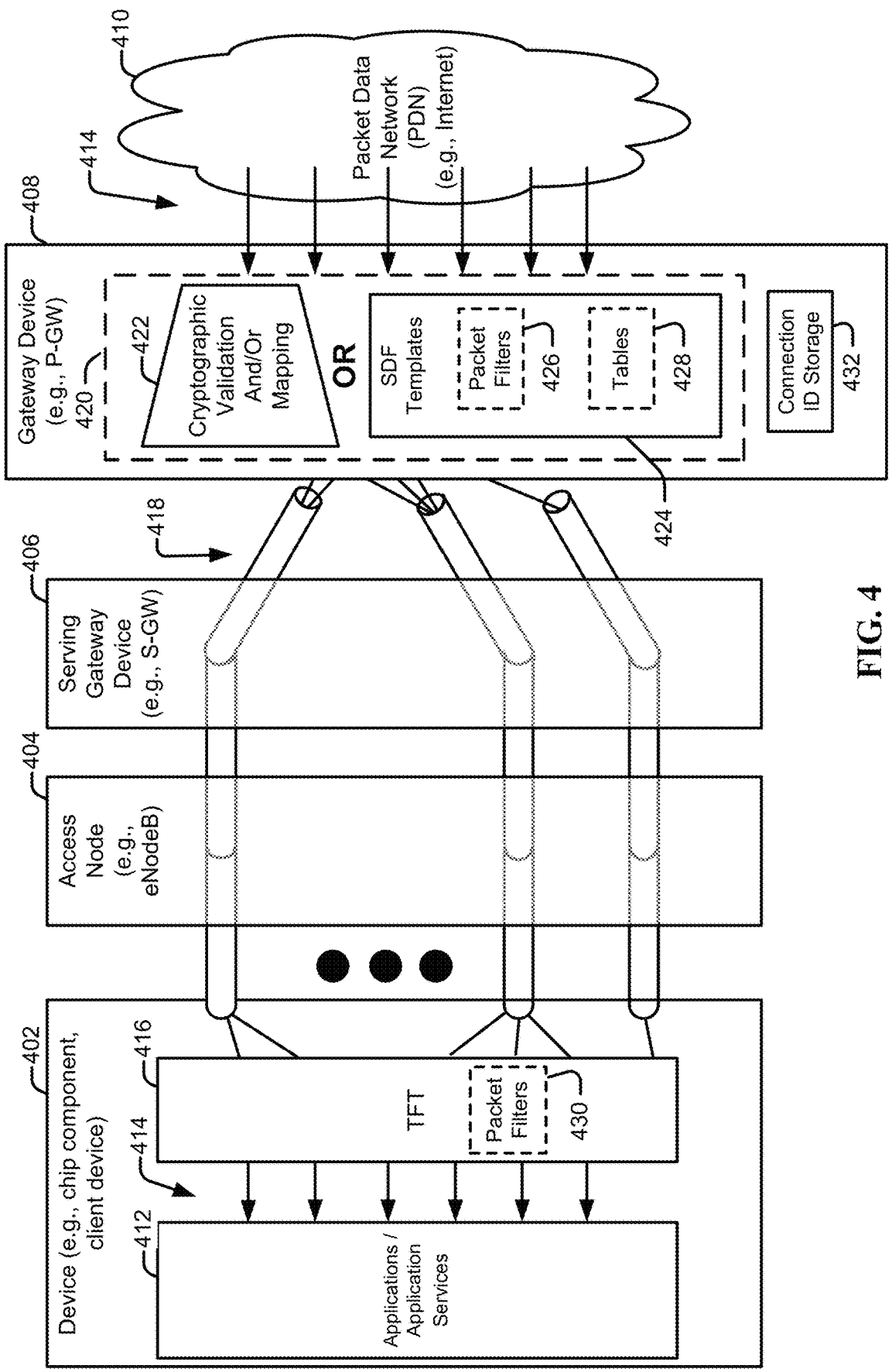
FIG. 4 is an example of a downlink operation in accordance with aspects described herein.

FIG. 4 is an example of a downlink operation in accordance with aspects described herein. The example is presented in the context of a long term evolution (LTE) cellular communication network for convenience. The example is not intended to place any limitation on the scope of any aspects described herein.

Represented in FIG. 4 are a device 402 (e.g., chip component, client device, user equipment, user device, terminal, mobile device), an access node 404 (e.g., eNodeB), a serving gateway device (S-GW) 406, a gateway device (e.g., P-GW) 408, and a PDN 410 (e.g., the Internet).

The exemplary downlink operation in FIG. 4 is now described. Downlink IP flows 414 (e.g., flows of IP packets in the user-plane from application servers (not shown) in the PDN 410) may be applied to a decision and processing module/circuit/function 420 of the P-GW 408. The number of downlink IP flows 414 depicted is illustrative and not intended to be limiting. The decision and processing module/circuit/function 420 may cause packets received from the downlink IP flows 414 (referred to herein as downlink data packets) to be passed/forwarded/sent/transferred/applied to a cryptographic validation and/or mapping module/circuit/function 422 or to service data flow (SDF) templates 424 and packet filters therein 426.

Downlink data packets having network access tokens included (e.g., embedded, associated) with the downlink data packets may be passed to the cryptographic validation and/or mapping module/circuit/function 422.

In one implementation, a network access token including an application identifier (App ID) may be included (e.g., embedded, associated) with a downlink data packet. The App ID may be used to determine a traffic network policy. The traffic network policy may be retrieved from an application server. In some aspects, the application server may be a first application server, which initiated a request to communicate with a device, or it may be a second application server with which the device seeks to initiate communication; however, a third application server is also acceptable. In some aspects, the traffic network policy may be retrieved from an application function (AF) associated with an application server. In other aspects, the traffic network policy may be retrieved from a subscription profile repository (SPR).

The traffic network policy may be based, for example, on a quality of service (QoS) profile or an access control list (ACL). Policies may be instituted, for example, in connection with application services to ensure that a device is not violating any agreements, is being provided access to subscribed application services, and/or is being provided with an agreed upon level of service (e.g., QoS). Such policies may be enforced by the P-GW against downlink data packets sent from the application server toward a device. By way of additional example, such policies may be used to enforce a rule that allows a device to receive downlink data packets from a pre-defined set of application services. By way of another example, the policies may be used to apply distinct charging or handling to packets associated with certain application services and/or devices.

In some implementations, the traffic network policy may include Quality of Service (QoS) parameters including, for example, service priority, maximum bandwidth, guaranteed bandwidth, and/or maximum delay. This information may be used by the cryptographic validation and/or mapping module/circuit/function 422, to map (e.g., by decrypting the network access token and using data included in the decrypted network access token) each downlink data packet associated with a network access token to a particular data flow or bearer from among a plurality of data flows or bearers 418 (e.g., evolved packet system (EPS) or IP-CAN bearers).

Downlink data packets in the downlink IP flows 414 that do not have network access tokens included (e.g., embedded, associated) therewith may be sent to the SDF templates 424 by the decision and processing module/circuit/function 420. Packet filters 426 may be included with the SDF templates 424. The use of the packet filters 426 of the SDF templates 424 may require more processing and memory resources than does the use of the cryptographic validation and/or mapping module/circuit/function 422. To perform filtering using the packet filters 426 of the SDF templates 424, the P-GW 408 may need to maintain table(s) 428 having separate table entries for each SDF. Each table entry may require identification of multiple parameters, such as, but not limited to App ID, maximum bit rate (MBR), and access point name-aggregate maximum bit rate (APN-AMBR). The packet filters 426 of the SDF templates 424 may map (e.g., by the filtering process) each downlink data packet that does not include a network access token to a particular data flow or bearer from among the plurality of data flows or bearers 418.

Three data flows or bearers 418 are illustrated for demonstrative purposes. In one aspect, a data flow or bearer can be shared by multiple applications/application services. Each of the data flows or bearers 418 may be associated with a unique set of parameters.

Downlink IP flows 414 can be mapped, for example, to a default data flow or bearer or to one or more dedicated data flows and/or one or more bearers. The default data flow or the default bearer may have a non-guaranteed bit rate, while a dedicated data flow or dedicated bearer may have either guaranteed or non-guaranteed bit rates. The data flows or bearers 418 may pass through the S-GW 406 and access node 404 (e.g., eNodeB). Aspects of the access node 404 (e.g., eNodeB) and S-GW 406 are not described herein and are known to those of ordinary skill in the art.

Upon reaching the device 402, the downlink IP flows 414 in the various data flows or bearers 418 may be applied to packet filters 430 included with a traffic flow template (TFT) 416. The packet filters 430 of the TFT 416 filter, or otherwise direct, the downlink IP flows 414 from the plurality of data flows or bearers 418 to their respective applications/application services 412 in the device 402. In one aspect, at least one of the data flows or bearers 418 may be shared by multiple applications/application services 412. The number of downlink IP flows 414 and data flows or bearers 418 depicted herein are illustrative and not intended to be limiting.

If derived, a Connection ID (described in connection with FIG. 6) may be stored in a Connection ID Storage 432 (e.g., a cache or memory circuit) area within the P-GW 408.

Network Access Token Setup and Use, Generally—Control-Plane Approach

Figure 5:
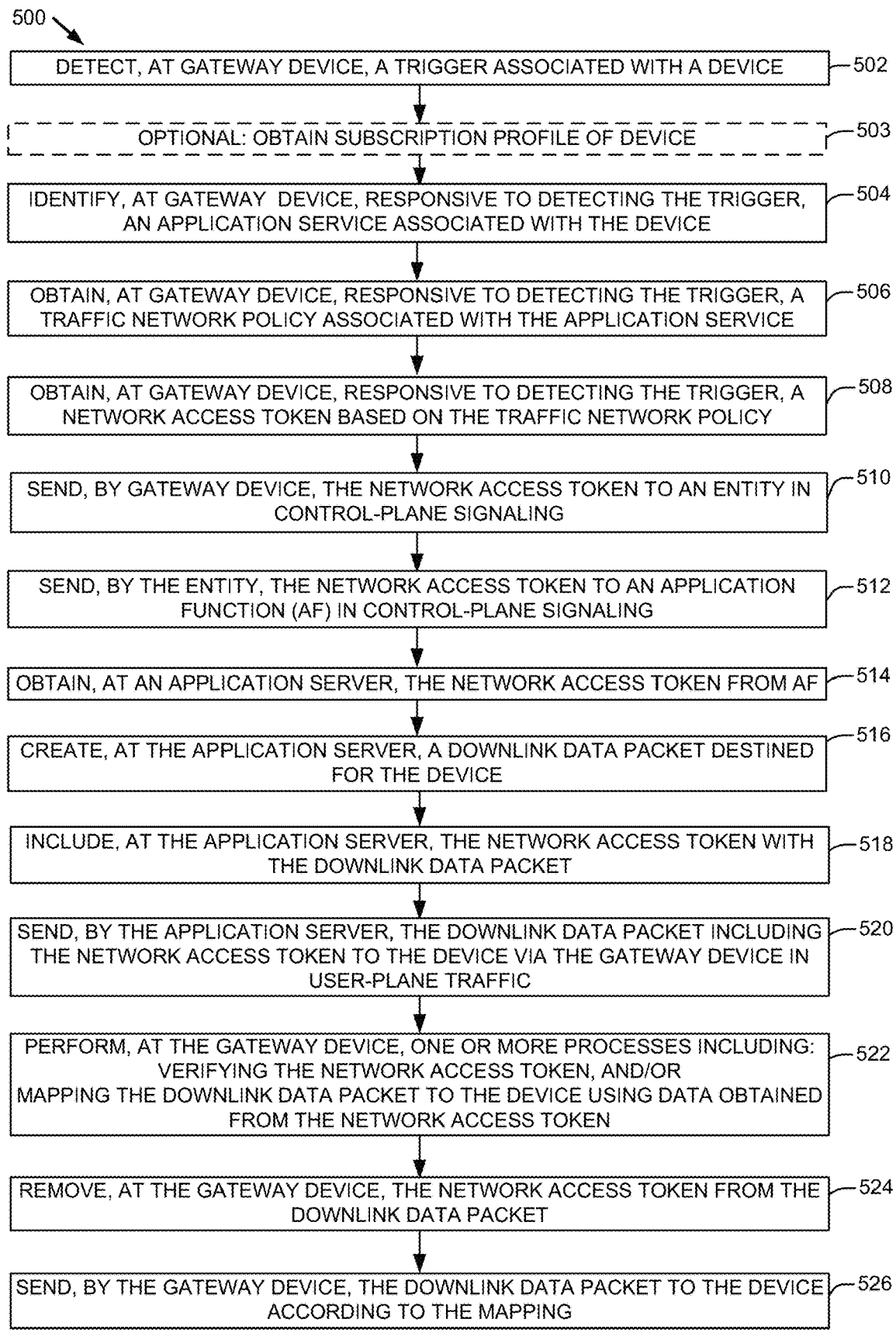
FIG. 5 is an exemplary flowchart depicting setup (e.g., service identification, network access token derivation, network access token sending) of a network access token at a gateway device (e.g., a P-GW) using the control-plane (C-Plane) and use of the network access token in the user-plane (U-plane).

FIG. 5 is an exemplary flowchart 500 depicting setup (e.g., service identification, network access token derivation, network access token sending) of a network access token at a gateway device (e.g., a P-GW) using the control-plane (C-Plane) and use of the network access token in the user-plane (U-plane). The order of operations performed by the gateway device is exemplary and not limiting. As discussed herein, the network access token may be used to validate and/or map a downlink data packet that includes (e.g., has embedded in/with, is associated with, is incorporated into, is added into) the network access token, where the downlink data packet is received at the gateway device in user-plane traffic, all in accordance with aspects described herein.

A gateway device (e.g., a packet data network (PDN) gateway device (P-GW)) may detect a trigger associated with a device 502. The trigger may be associated with the device by, for example, the inclusion of a device identifier or a device address in data and/or signaling representative of the trigger. In one exemplary implementation, the data and/or signaling representative of the trigger may be associated with the device (e.g., a chip component, client device, user equipment); the device may cause the data and/or signaling to be received at the gateway device via an intermediate node. The data and/or signaling may represent the trigger to the gateway device. In general, detecting a trigger associated with a device may cause the gateway device to obtain (e.g., derive, generate, compute, partially compute, etc.) a network access token and send that network access token to a PCRF.

One or more application services may be associated with or linked to the device. For example, the one or more application services may be used by the device or the one or more application services may be a destination of packets sent from the device to the application server(s) hosting the one or more application services. In one implementation, the gateway device may identify an application service associated with the device, responsive to detecting the trigger 504. The gateway device may obtain a traffic network policy associated with the application service, responsive to detecting the trigger 506. It is noted that a traffic network policy may be associated with one or more application services.

In one implementation the gateway device may obtain the traffic network policy associated with an application service from a PCRF. In one implementation, the gateway device may obtain the traffic network policy associated with an application service from a subscription profile repository (SPR). In one implementation, for example, the gateway device (e.g., P-GW 320, FIG. 3) may obtain the traffic network policy from a PCRF (e.g., 332, FIG. 3) that has an interface with an SPR (e.g., 334, FIG. 3).

The gateway device may obtain a network access token, responsive to detecting the trigger 508. The network access token may be based on (e.g., linked to, be a function of, include, or be derived from) the traffic network policy. The traffic network policy may be defined, for example, either (1) based on a service level agreement between a mobile network operator (MNO) and an application service provider (ASP), or (2) based on a subscription profile of the device, or any combination thereof.

In some exemplary implementations, obtaining the network access token based on the traffic network policy may facilitate enforcement of a policy of the network that is not device-specific for that traffic. For example, a mobile network operator (MNO) may have an agreement with the application service provider (ASP) to provide one or more services for all devices (e.g., UEs) in which a subscription may not be needed.

In some implementations, the subscription profile of the device may include a field that indicates whether a network access token is permitted to be obtained in connection with the device. Accordingly, as an option, the gateway device may obtain a subscription profile of the device 503, wherein the subscription profile identifies whether use of a network access token is permitted in connection with validating and/or mapping downlink data packets destined for the device in accordance with aspects described herein.

The network access token may facilitate validating and/or mapping a downlink data packet obtained at the gateway device in user-plane traffic (e.g., user-plane data traffic) that is destined for the device. In some implementations, obtaining the network access token may be a part of a process of validating and/or mapping a downlink data packet to be received at the gateway device in user-plane traffic. The network access token may be linked to the device and/or one or more application services (e.g., an application service associated with the device, an application service with which the device will interact, an application service identified by the gateway device as being associated with the device).

The gateway device may send the network access token to an entity (e.g., device, server, policy and charging rules function (PCRF), application function (AF), node) in control-plane signaling 510. In some implementations, the entity may be a policy and charging rules function (PCRF). According to one aspect, the gateway device may send the network access token to the PCRF in control-plane signaling via an interface such as a Gx reference point. In some implementations, the network access token may be obtained at the gateway device and sent to the entity in control-plane signaling prior to obtaining a downlink data packet (including the network access token) at the gateway device in user-plane traffic.

The entity (e.g., the PCRF) may send the network access token to an application function (AF) in control-plane signaling 512. According to one aspect, the PCRF may send the network access token to the AF via an interface such as an Rx reference point.

Obtaining, at the application function, the network access token from the PCRF via the Rx reference point may beneficially reuse an existing interface. In other words, according to some aspects described herein, a new reference point is not required to implement the methods described herein. However, nothing herein limits an application function to obtaining a network access token only via the Rx interface. An application function may obtain the network access token through any interface.

The application function (AF) may be a control-plane entity on or associated with an application server. The AF may configure the application sever to include (e.g., embed, associate, incorporate, add) the network access token with downlink data packets sent to the device.

The application server may be a user-plane entity responsible for creating downlink data packets. In one implementation, an application server may obtain the network access token from the application function 514. The application server may create (e.g., construct, compile, form, assemble) a downlink data packet destined for the device (e.g., directed to the device, headed for the device, going to the device, intended to be delivered to the device, the destination address of the downlink data packet corresponds to the address of the device) 516. The application server may include the network access token (that is linked to the device) with the downlink data packet 518. The application server may send the downlink data packet including the network access token to the device via the gateway device (e.g., P-GW) in user-plane traffic 520.

Downlink data packets may be sent in user-plane data transmissions from the application server to the device via the gateway device (e.g., P-GW) of a core network. The user-plane data transmissions may comprise one or more downlink data packets including network access tokens.

The gateway device (e.g., P-GW) may obtain the downlink data packet including the network access token. The gateway device may perform one or more process 522 including verifying the network access token (for example, to validate the downlink data packet that included the network access token) and/or mapping the downlink data packet to the device using data obtained from the network access token. The gateway device may remove (e.g., extract) the network access token from the downlink data packet 524. Removing the network access token may be done before or after verifying the network access token. If done after, and if verification fails, no further processing (e.g., network access token removal) is necessary. The gateway device may send the downlink data packet (e.g., without the network access token) to the device according to the mapping 526.

Figure 6:
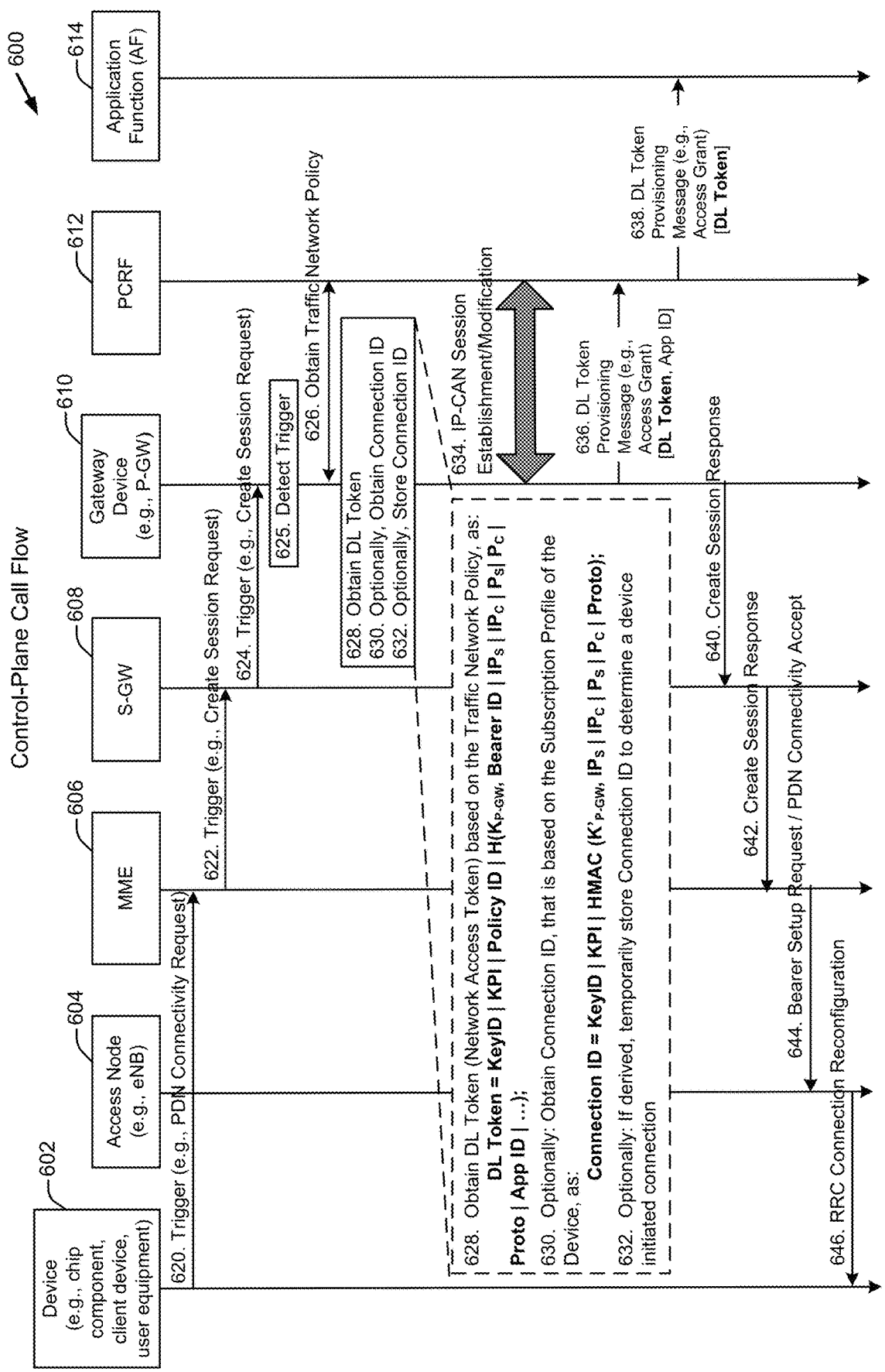
FIG. 6 is an exemplary control-plane call flow diagram depicting one example of setup (e.g., service identification, network access token derivation, network access token sending) of a network access token (alternatively referred to herein and in FIG. 6 as a "DL token") in the control-plane, in accordance with aspects described herein.

FIG. 6 is an exemplary control-plane call flow diagram 600 depicting one example of setup (e.g., service identification, network access token derivation, network access token sending) of a network access token (alternatively referred to herein and in FIG. 6 as a "DL token") in the control-plane, in accordance with aspects described herein. The illustrated exemplary network access token setup is device/access node agnostic. In other words, from the perspective of a gateway device 610 (e.g., a packet data network gateway device (P-GW)), the setup (e.g., service identification, token derivation, token sending) of a network access token in control-plane traffic, where the network access token is to be used in a process of validating and/or mapping a downlink data packet to be received at the gateway device 610 in user-plane traffic, is not dependent on whether the setup is due to an action of the device (e.g., an initial attach procedure action) or an action of the access node (e.g., a handover action). According to the aspects described herein, the network access token setup may apply equally well to the initial PDN connectivity request procedure as well as to any dedicated data flow or bearer setup/activation/modification procedures that may follow.

FIG. 6 includes representations of a device 602 (e.g., chip component, client device, user equipment), an access node 604 (e.g., eNodeB), a mobility management entity (MME) 606, a serving gateway device (S-GW) 608, a gateway device 610 (e.g., a packet data network gateway device (P-GW)), a policy and charging rules function (PCRF) 612, and an application function (AF) 614. The AF 614 may be an entity on the control-plane and may exercise controls associated with an interface to the PCRF 612.

In general, in the implementation of FIG. 6, detecting a trigger (e.g., anything, such as an act or event, that initiates or precipitates a reaction or series of reactions, a predetermined act, a predetermined event) may cause the gateway device 610 (e.g., P-GW) to perform one or more of obtaining a traffic network policy associated with an application service, obtaining a network access token based on the traffic network policy, and/or sending the network access token to an entity in control-plane signaling. In other words, any one or more of obtaining the traffic network policy associated with the application service, obtaining a network access token based on the traffic network policy, and/or sending the network access token to an entity in control-plane signaling may be responsive to detecting the trigger.

In the implementation of FIG. 6, for example, obtaining 624 (e.g., receiving) a "create session request" (where a "create session request" is a control-plane message) at the gateway device 610 (e.g., P-GW) may act as a trigger to the gateway device 610. Other triggers are acceptable and are contemplated.

FIG. 6 illustrates a control-plane call flow implementing a trigger, where the trigger is related to establishing a bearer (e.g., the trigger of FIG. 6 may include obtaining, at the gateway device 610, the create session request). The exemplary control-plane call flow diagram 600 is described in connection with a bearer as used, for example, in 4G, LTE, LTE-A cellular communication networks; however, nothing herein limits the aspects described herein to cellular communication networks that use bearers. All aspects described herein will be understood by those of skill in the art to also apply to communication networks that implement more generally described "data flows" in comparison to bearers as used, for example, in 4G, LTE, LTE-A cellular communication networks.

Turning now to the exemplary control-plane call flow diagram 600 of FIG. 6, a device (e.g., chip component, client device, user equipment) may send 620 a PDN connectivity request to an MME 606. The MME 606, in response to (e.g., responsive to) the PDN connectivity request, may send 622 a create session request to an S-GW 608. The S-GW 608 may send the create session request to the gateway device 610 (where the gateway device 610 is, in turn, obtaining 624 (e.g., receiving, etc.) the create session request). These, and or other control-plane messages may be considered triggers. The gateway device 610 may detect the trigger 625. Detection of the trigger (e.g., obtaining 624 the create session request at the gateway device) may cause the gateway device 610 to perform one or more of obtain the traffic network policy associated with an application service 626, obtain the network access token based on the traffic network policy 628, and/or send 636 the network access token to an entity in control-plane signaling.

By way of example, a gateway device 610 (e.g., a P-GW) may obtain the traffic network policy for an application service 626 from the PCRF 612. The traffic network policy may be device specific or application specific. For the former case, the traffic network policy may be determined based on a subscription profile (which the PCRF may obtain from a subscription profile repository (SPR)). For the latter case, an application service provider (ASP) may provide/negotiate a traffic network policy on the application traffic that may be applied to all devices with a mobile network operator (MNO), which may be stored in the PCRF.

By way of example, the gateway device 610 may obtain a network access token (DL token) 628 based on the traffic network policy. For example, the traffic network policy may include, among other things, a key parameter index (KPI) that may define the fields used for DL token derivation or define a list of input parameters used to derive the DL token. The traffic network policy may include, among other things, a policy identifier (Policy ID) that may define a flow treatment policy (e.g., QoS policy, mapping the flow to a data flow or bearer, and other aspects of flow treatment policies as understood by those of skill in the art).

By way of example and not limitation, the network access token (DL Token) may be given as:

DL Token=KeyID|KPI|Policy ID|H($K_{P\text{-}GW}$, Policy ID|$IP_S$|$IP_C$|$P_S$|$P_C$|Proto|App ID| . . . ), where: KeyID is an identifier of a key (e.g., $K_{P\_Gw}$) used for obtaining (e.g., deriving, generating, computing, etc.) the DL token, KPI is a key parameter index that may define the fields used for DL token derivation or defines a list of input parameters used to derive the DL token, Policy ID is a policy identifier that may define a flow treatment policy (e.g., QoS policy, mapping the flow to a data flow or bearer, and other aspects of flow treatment policies as understood by those of skill in the art), H is a secure hash function (alternatively, for example, a hash message authentication code (HMAC) could be used), $K_{P\text{-}GW}$ is a secret key of the gateway device 610 (e.g., a P-GW), $IP_S$ is the server (e.g., application server) IP address, $IP_C$ is the client (e.g., chip component, client device, user equipment) IP address, $P_S$ is the server port number, $P_C$ is the client port number, Proto is a protocol number or identifier, and App ID is an application identifier.

The KeyID may be assigned by the gateway device 610 (e.g., a P-GW). It is noted that the DL token is generated by the gateway device 610 based on a secret key (e.g., KP-GW) only known to the gateway device 610. Hence, the KeyID, as a part of the DL token, is also assigned by the gateway device 610. The secret key (e.g., KP-GW) is stored at the gateway device 610 (e.g., the P-GW).

The IP addresses and port numbers of the server and client devices, the protocol number or identifier and App ID may be included in the packet comprising the target to be detected at the gateway device 610.

The Policy ID that may be included in the network access token (DL token) may be used to map the downlink data packet (which includes the DL token) to a given data flow or bearer. Alternatively, it may be possible to use the KeyID for the Policy ID; in which case the Policy ID value may not be used in the derivation (e.g., calculation) of the DL token. Additional or alternate parameters may include a priority and/or a quality of service class identifier (QCI). Other formulae for derivation of the DL token may by acceptable.

As known to those of skill in the art, the vertical lines between the exemplary parameters described above indicate a concatenation function.

Optionally, the gateway device 610 (e.g., P-GW) may obtain a connection identifier (Connection ID) 630. The Connection ID may be used to identify a device initiated connection (e.g., a chip component/client device/UE initiated connection). In one aspect, by way of example and not limitation, the Connection ID may be given as:

Connection ID=KeyID|KPI|HMAC($K'_{P\text{-}GW}$, $IP_S$|$IP_S$|$P_S$|$P_C$|Proto).

where, $K'_{P\text{-}GW}$ may be a secret key known to the P-GW that is different from the secret key, $K_{P\text{-}GW}$, GW, used to derive the DL token.

Optionally, if derived, the Connection ID may be stored 632 in a Connection ID storage location in a cache or memory/storage device of the gateway device 610.

The gateway device 610 (e.g., the P-GW) may also perform IP-CAN session establishment/modification 634.

The gateway device 610 may send 636 the network access token (DL token) to the PCRF 612. The gateway device 610 may send 636 the network access token to the PCRF 612 in control-plane signaling.

In some implementation, the gateway device 610 (e.g., the P-GW) may send 636 the network access token to the PCRF 612 in a message. In some implementations, the message may be referred to as a network access token provisioning message (and may also be referred to as a DL token provisioning message in FIG. 6). An access grant message may be one example of a network access token provisioning message. FIG. 6 includes reference to an access grant message, however, the reference is exemplary and not limiting.

The network access token provisioning message may be appropriate when an application service/application server does not request the access (e.g., cellular network access to send data to the device, where the ingress point to the cellular network from an application server point of view is the gateway device 610 (e.g., the P-GW), but instead, the access is based, for example, on a policy of the cellular network. Optionally, the gateway device 610 may send 636 an application identifier (App ID) with the DL token. For example, the downlink token provisioning message may optionally include the application identifier (App ID). The App ID may be used to identify an application server (or application service hosted thereon). The App ID may also be used to identify a traffic network policy.

The PCRF 612 may send 638 the network access token (DL token) to the application function (AF) 614. The PCRF 612 may send 638 the DL token to the AF 614 in control-plane signaling. The PCRF 612 may send 638 the DL token to the AF 614 in a DL token provisioning message (e.g., an access grant message in the control-plane).

Additionally, the gateway device 610 (e.g., the P-GW) may send 640 a create session response to the S-GW 608. The S-GW 608 may send 642 the create session response to the MME 606. In response to the create session response, the MME 606 may send 644 a bearer setup request/PDN connectivity accept (or data flow setup request/PDN connectivity accept) to the access node 604 (e.g. eNodeB). The access node 604 may then send 646 a radio resource control (RRC) connection reconfiguration message to the device 602. Communication between the device 602, access node 604, MME 606, S-GW 608, gateway device 610 (e.g., P-GW), PCRF 612, and AF 614 in the exemplary control-plane call flow diagram 600 of FIG. 6 may occur in the control-plane (C-Plane).

Figure 7:
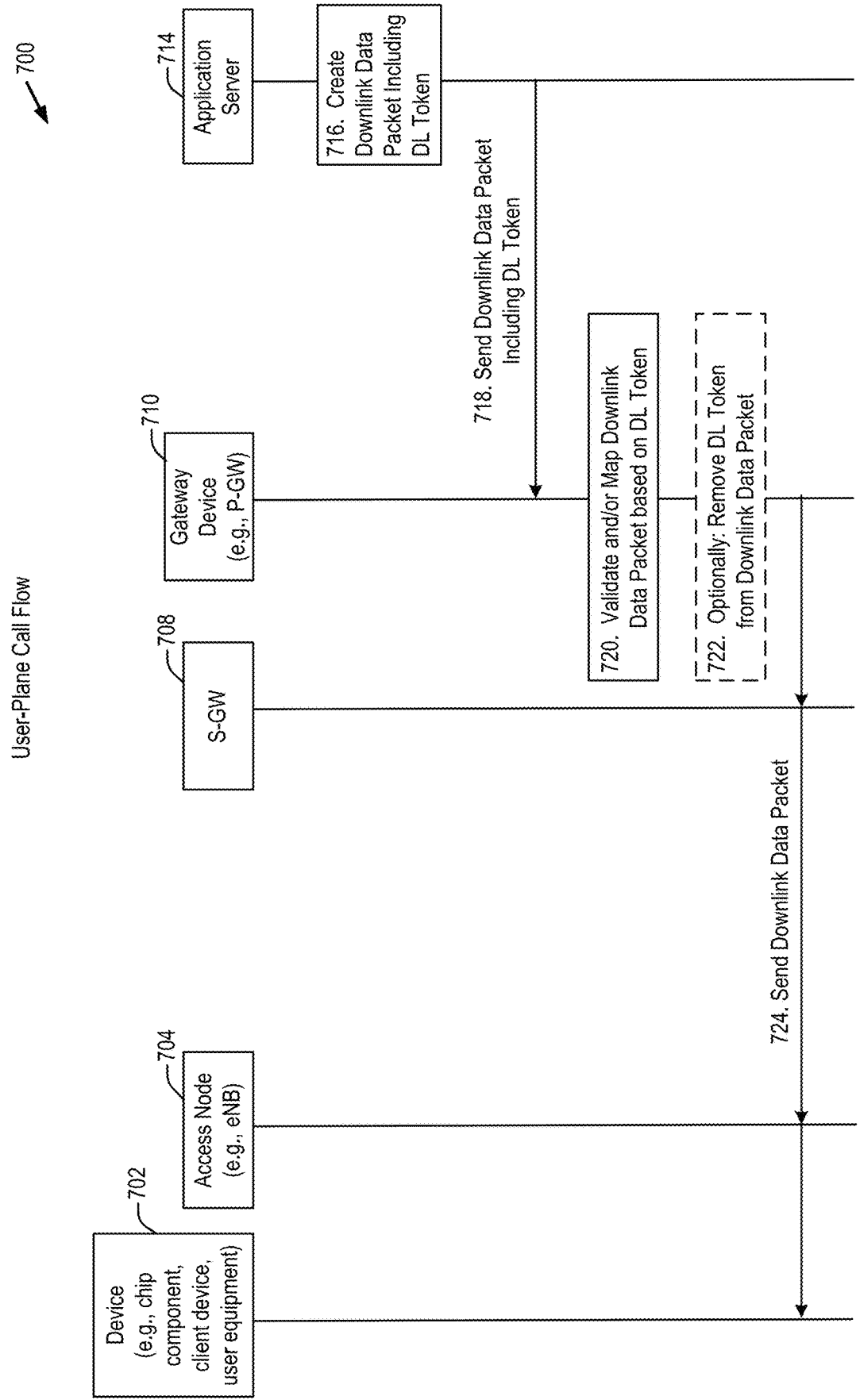
FIG. 7 is an exemplary user-plane call flow diagram depicting one example of use of a network access token (alternatively referred to herein and in FIG. 7 as a "DL token") in the user-plane, in accordance with aspects described herein.

FIG. 7 is an exemplary user-plane call flow diagram 700 depicting one example of use of a network access token (alternatively referred to herein and in FIG. 7 as a "DL token") in the user-plane, in accordance with aspects described herein. The call flow depicted in FIG. 7 may be preceded by the call flow depicted in FIG. 6. In other words, in the call flow of FIG. 6, the network access token (DL token) may be sent to an application function (e.g., AF 614, FIG. 6) in the control-plane; an application server (e.g., 714, FIG. 7) may be associated with the application function (e.g., AF 614, FIG. 6) and may obtain the network access token (DL token) from the application function (e.g., AF 614, FIG. 6); however, in the call flow of FIG. 7, the application server 714 creates a downlink data packet, includes the DL token with the downlink data packet, and sends the downlink data packet including the DL token to a gateway device 710 in user-plane traffic.

FIG. 7 includes representations of a device 702 (e.g., chip component, client device, user equipment), an access node 704 (e.g., eNodeB), a serving gateway device (S-GW) 708, a gateway device 710 (e.g., a packet data network gateway device (P-GW)), and an application server 714.

The application server 714 may be an entity on the user-plane. The application server 714 may implement functions including, for example, creation of downlink data packets and downlink data packet transmission over the user-plane. Downlink data packet transmission to a device 702 may be via the gateway device 710 (e.g., P-GW).

The application server 714 may obtain the network access token from an application function (e.g., AF 614, FIG. 6). The network access token may be linked to a given device and/or an application service. The application server 714 may create (e.g., construct, compile, form, assemble) downlink data packets for the given device 702 (e.g., destined to be delivered to the given device 702); additionally, the application server 714 may include (e.g., embed, associate, incorporate, add) the DL token with the downlink data packet 716. The downlink data packet including the DL token may be sent 718 to the device 702 via the gateway device 710 (e.g., P-GW) in user-plane traffic.

The gateway device 710 (e.g., P-GW), for example via a policy and charging enforcement function (PCEF) or via a decision and processing module/circuit/function (420, FIG. 4), may evaluate downlink data packets received in user-plane traffic. The evaluation may be made to identify a downlink data packet that includes a network access token.

The downlink data packet that includes the network access token may be validated and/or mapped based on the network access token 720. The gateway device 710 may optionally remove the network access token (DL Token) from the downlink data packet 722. Removing the network access token may be performed before or after validation of the downlink data packet.

In one aspect, a downlink data packet may be validated by verifying the network access token (DL token) included with the downlink data packet. If the validation is positive, the downlink data packet may be mapped to the device using data obtained from the DL token. With or without validation, the downlink data packet may be mapped to the device 702 using data obtained from the network access token. The gateway device 710 may then send 724 the downlink data packet to the device 702 via a data flow or bearer appropriate to the mapping (e.g., appropriate to requirements identified in the data obtained from the network access token). As shown in the implementation of FIG. 7, the gateway device 710 may send 724 the downlink data packet to the device 702 without the network access token.

Communication between the application server 714, the gateway device 710, the S-GW 708, the access node 704, and the device 702 in the exemplary user-plane call flow diagram 700 of FIG. 7 may occur in the user-plane (U-Plane).

Aspects described herein are not limited to the use of "bearers" as defined in present 3GPP standards. Bearers or data flows through the core network (e.g., including, for example, gateway device 710 (e.g., P-GW) and S-GW 708) and/or the core network and RAN (e.g., access node 704) may be established for a device by the network. Therefore, it may be possible for data flows to be established once an RRC connection is established; and for a data flow between the gateway device 710 and S-GW 708 to be maintained during idle mode. It is also noted that the application server 714 may send copies of the network access token in downlink data packets destined for a given device 702 even if an RRC connection has not been established.

Exemplary Protocol Stacks

Figure 8:
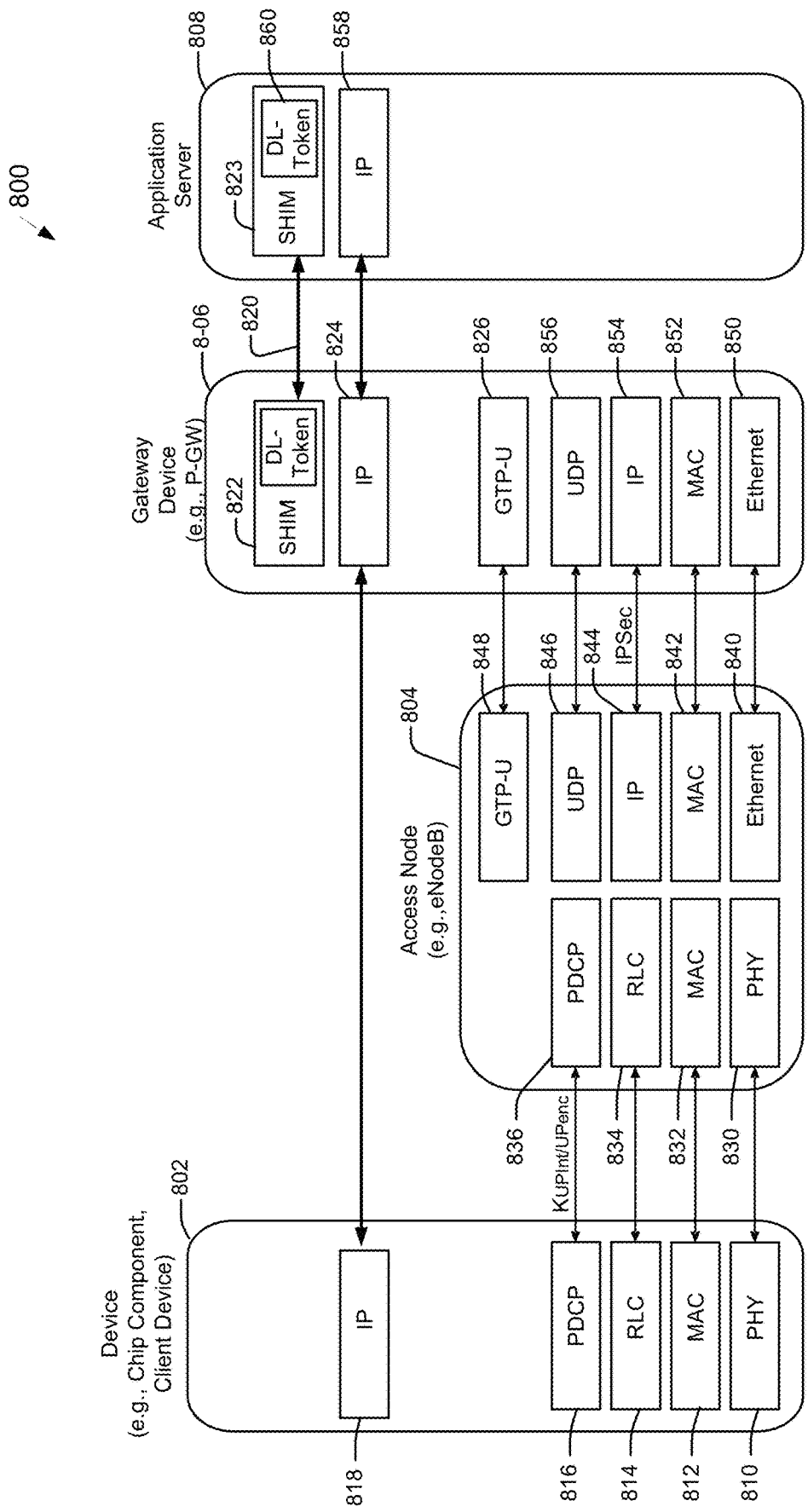
FIG. 8 is an exemplary illustration of a first user-plane protocol stack in accordance with aspects described herein.

Use of network access tokens may be described with respect to the movement of the network access tokens among protocol stacks of a device, an access node, a gateway device, and an application server. Illustrated herein are two exemplary sets of user-plane protocol stacks. Several of the layers represented in the protocol stacks, and the interconnections among the layers, will be described briefly with respect to the illustration of FIG. 8. Their descriptions will not be repeated in connection with the description of FIG. 8 to avoid repetition and improve conciseness of the application. FIG. 8 includes a shim layer 820, which may be considered as a layer utilized for the movement of the network access tokens. FIG. 8 utilizes an IP layer for movement of network access tokens.

FIG. 8 is an exemplary illustration of a first user-plane protocol stack 800 in accordance with aspects described herein. In the user-plane protocol stack of FIG. 8, a shim layer 820 is implemented for token embedding. FIG. 8 depicts a device 802 (e.g., chip component, client device, user equipment), an access node 804 (e.g., eNodeB), a gateway device 806 (e.g., P-GW), and an application server 808. In the exemplary illustration FIG. 8, a protocol stack of the device 802 may include, from lowest layer upward, a physical (PHY) layer 810, a medium access control (MAC) layer 812, a radio link control (RLC) layer 814, a packet data convergence protocol (PDCP) layer 816, and an IP layer 818.

In one aspect, the shim layer 820 may be implemented in the protocol stacks of the gateway device 806 and the application server 808. Shim layer 820 may facilitate movement of network access tokens between the gateway device 806 and application server 808 in accordance with aspects described herein. In one aspect, a shim layer 822 of the gateway device 806 lies above the IP layer 824 of the gateway device 806 and a shim layer 823 of the application server 808 lies above the IP layer 858 of the application server 808. As illustrated in FIG. 8, the network access token 860 may be transported between the application server 808 and the gateway device 806 without a need to transport the network access token to/through the access node 804 and/or the device 802.

The aspect illustrated by FIG. 8 may be useful for movement of a network access token 860 from the application server 808 to the gateway device 806. By way of example, during enforcement operations (in contrast to token setup and sending operations), the gateway device 806 may receive a network access token 860 from the application server 808 in user-plane traffic via the shim layer 820.

In accordance with one aspect of the use of the network access token 860, the application server 808 may include a copy of a given network access token in packets destined for the device 802. The shim header of the shim layer 820 may carry the network access token 860 to the gateway device 806 as shown in FIG. 8.

In one implementation, if verification of the network access token 860 at the gateway device 806 is successful, the gateway device 806 may map and send the downlink data packet to the device 802 using data obtained from the network access token. If verification of the network access token 860 at the gateway device 806 is not successful, the gateway device 806 may discard the downlink data packet and network access token 860. The gateway device 806 may or may not discard the network access token 860 prior to sending the downlink data packet that included the network access token 860 to the device 802. According to some aspects, discarding the network access token, before sending the downlink data packet to the device, saves transmission bandwidth and time in that neither the device, nor an access node (e.g. eNodeB) through which the downlink data packet passes employs the network access token.

The layers of the protocol stacks of the device 802, gateway device 806, and application server 808 will now be briefly described. In the exemplary illustration of FIG. 8, a protocol stack of the access node 804 may include, from lowest layer upward, a physical (PHY) layer 830, a medium access control (MAC) layer 832, a radio link control (RLC) layer 834, and a packet data convergence protocol (PDCP) layer 836, which respectively join with like named layers (810, 812, 814, and 816) of the device 802. In the exemplary illustration of FIG. 8, a protocol stack of the access node 804 may additionally include, from lowest layer upward, an Ethernet layer 840, a MAC layer 842, an IP layer 844, a user datagram protocol (UDP) layer 846, and a general packet radio service (GPRS) Tunneling Protocol (GTP)-user data (GTP-U) layer 848 (where GTP-U is used for carrying user data within the GPRS core network and between the radio access network (e.g., access node 804 of a RAN) and the core network (e.g., in the example of FIG. 8, the gateway device 806 of the core network)). The Ethernet layer 840, MAC layer 842, IP layer 844, UDP layer 846, and GTP—U layer 848 respectively join with like named layers (750, 852, 854, 856, and 826) of the gateway device 806. In the exemplary illustration of FIG. 8, the IP layer 818 of the device 802 couples to the IP layer 824 of the gateway device 806, while the IP layer 824 of the gateway device 806 couples to the IP layer 858 of the application server 808.

Figure 9:
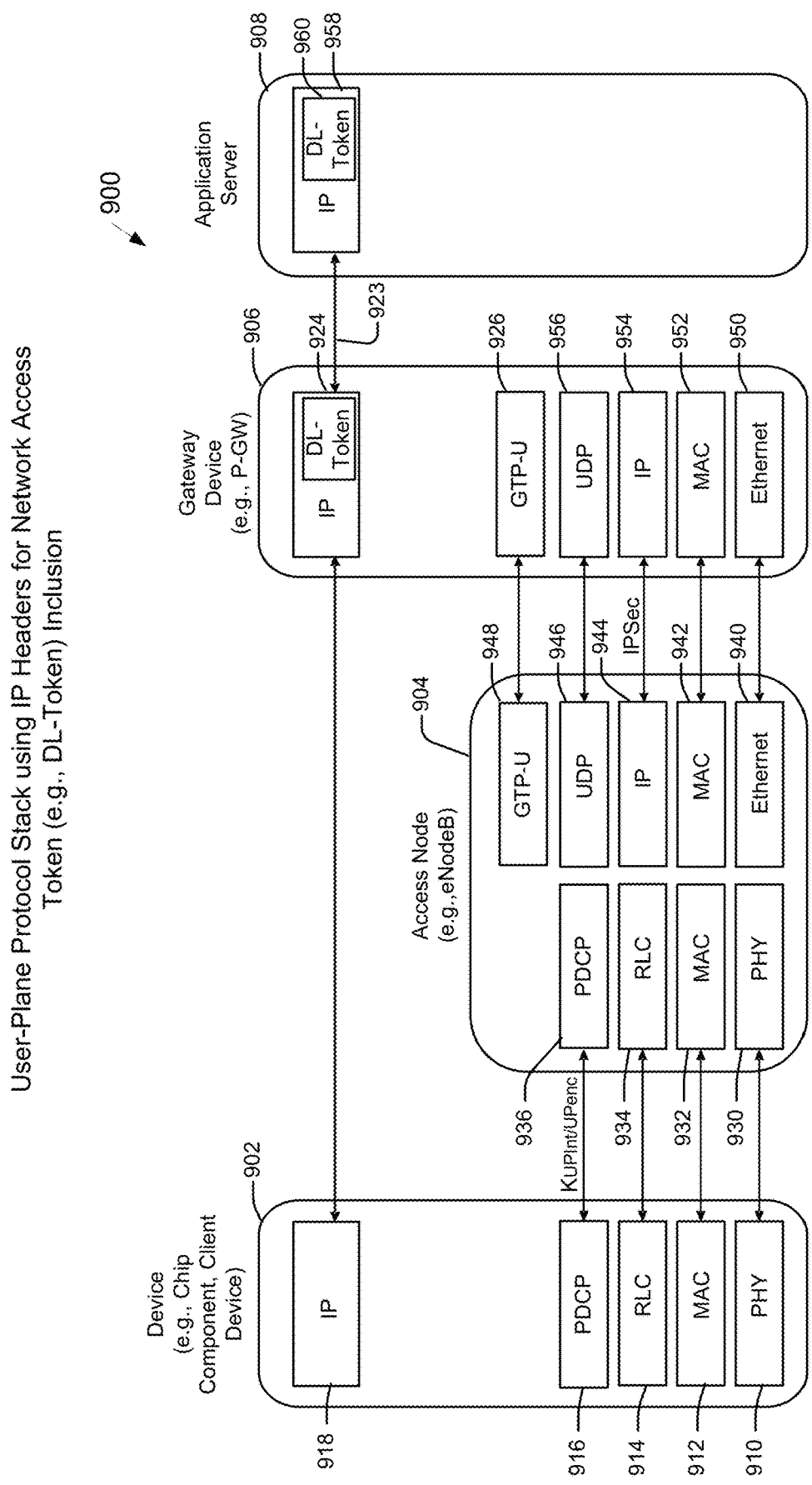
FIG. 9 is an exemplary illustration of a second user-plane protocol stack in accordance with aspects described herein.

FIG. 9 is an exemplary illustration of a second user-plane protocol stack 900 in accordance with aspects described herein. The user-plane protocol stack of FIG. 9 makes use of an IP header for network access token embedding. FIG. 9 depicts a device 902 (e.g., chip component, client device), an access node 904 (e.g., eNodeB), a gateway device 906 (e.g. P-GW), and an application server 908. In the exemplary illustration of FIG. 9, a protocol stack of the device 902 may include, from lowest layer upward, a physical (PHY) layer 910, a medium access control (MAC) layer 912, a radio link control (RLC) layer 914, a packet data convergence protocol (PDCP) layer 916, and an Internet Protocol (IP) layer 918.

In one aspect, the header of the IP layer 918 may facilitate movement of a network access token (referred to herein and in FIG. 9 as a DL token) 960 between the gateway device 906 and application server 908 in accordance with aspects described herein. Internet Protocol (IP) version 4 (IPv4) and Internet Protocol (IP) version (IPv6) may both employ the aspects described herein.

The aspect illustrated by FIG. 9 may be useful for movement of a DL token 960 from the application server 908 to the gateway device 906. By way of example, during enforcement operations, the gateway device 906 may receive a DL token 960 from the application server 908 in user-plane traffic. In accordance with one aspect of the use of the DL token, the application server 908 may include a copy of a given DL token in downlink data packets destined for the device 902. The IP header in the IP layer 923 may carry the DL token 960 (embedded in a downlink data packet) to the gateway device 906 as shown in FIG. 9.

In one implementation, if verification of the DL token 960 at the gateway device 906 is successful, the gateway device 906 may map and send the downlink data packet to the device 902 using data obtained from the DL token. If verification of the DL token 960 at the gateway device 906 is not successful, the gateway device 906 may discard the downlink data packet and DL token 960. The gateway device 906 may or may not discard the DL token 960 prior to sending the downlink data packet that included the DL token 960 to the device 902.

The layers of the protocol stacks of the device 902, access node 904, gateway device 906, and application server 908 that were described in connection with FIG. 9 will not be described as their descriptions are the same or similar to those of like named layers in FIG. 7.

Concerning delivery of downlink data packets including DL tokens, in one aspect the DL token may be embedded in an IP header, such as an IP version 4 (IPv4) header or an IP version 6 (IPv6) header. The IP header in IPv4 may be an IPv4 Options Field. Concerning the IP Options Field, a new option number may be defined in Internet Engineering Task Force (IETF) for use of the exemplary IPv4 Options Field. The IP header in IPv6 may be an IP extension header. Concerning the IP extension header, a code, such as a Next Header Code, may be defined in Internet Engineering Task Force (IETF) for use of the exemplary IPv6 extension header. In one aspect, the DL token 960 may be embedded in a Transmission Control Protocol (TCP) header. The DL token 960 may be embedded in an Options field of the TCP header. In one aspect, the DL token 960 may be embedded in a Secure Socket Layer (SSL) header. In one aspect, the DL token 960 may be embedded in a Transport Layer Security (TLS) record header. Concerning the TLS record, a new record type may be defined in Internet Engineering Task Force (IETF) for the exemplary TLS record protocol. In one aspect, the DL token 960 may be embedded in a shim header between an IP header and a Transmission Control Protocol/User Datagram Protocol (TCP/UDP) header (not shown). In still another aspect, the DL token 960 may be embedded in a Hypertext Transfer Protocol (HTTP) header (not shown). The HTTP header may be an HTTP eXperimental or eXtension header. The HTTP eXperimental or eXtension header may make use of an X-tag for unsecure HTTP connections.

Exemplary Gateway Device

Figure 10:
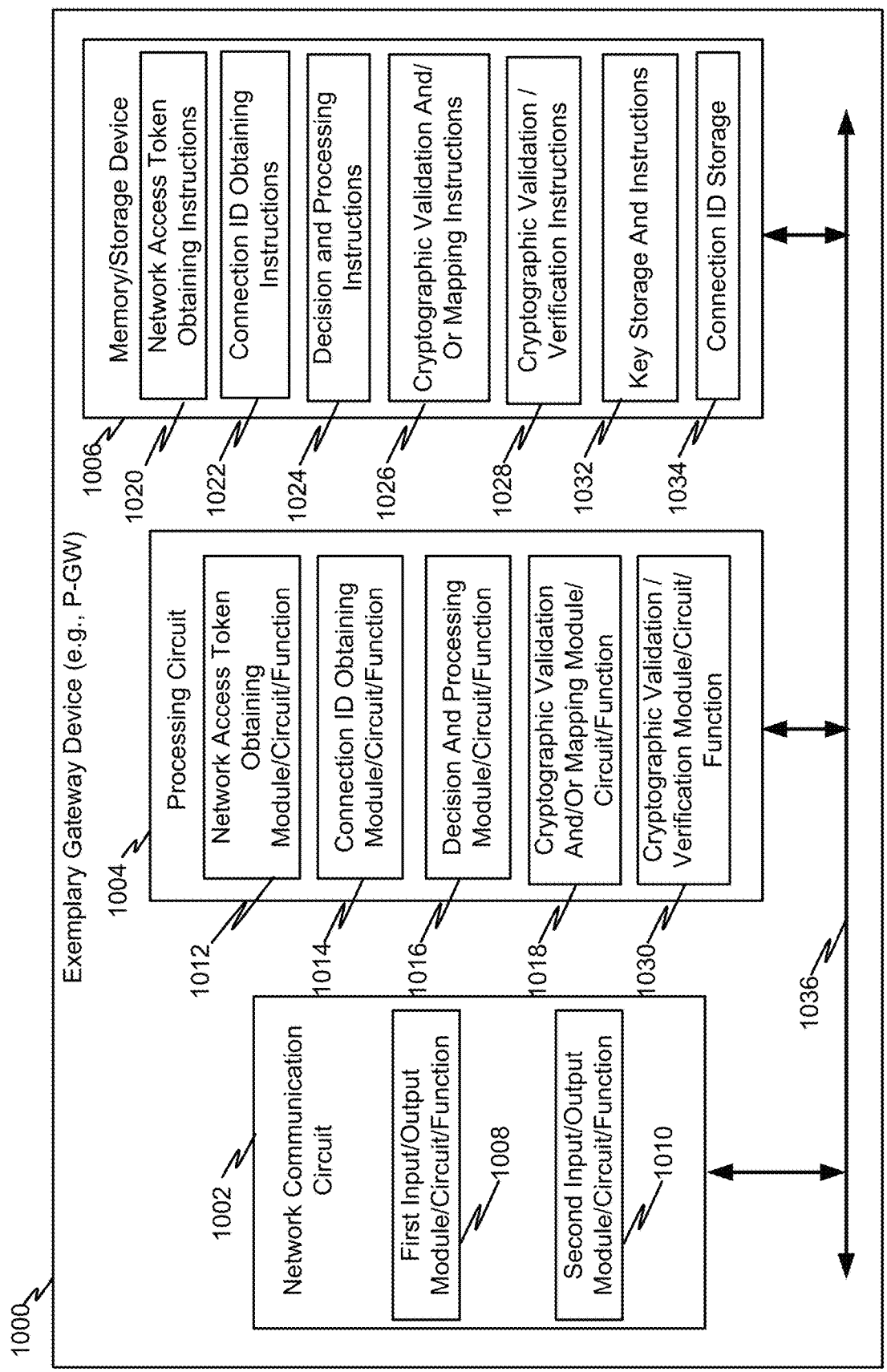
FIG. 10 is a block diagram illustrating an exemplary gateway device adapted to support validation and/or mapping of downlink data packets including network access tokens in accordance with aspects described herein.

FIG. 10 is a block diagram illustrating an exemplary gateway device 1000 adapted to support validation and/or mapping of downlink data packets including network access tokens in accordance with aspects described herein. In one example, the exemplary gateway device 1000 may include a network communication circuit 1002, a processing circuit 1004 coupled to the network communication circuit 1002, and memory/storage device 1006 coupled to the processing circuit 1004. This list is non-limiting. These circuits and/or devices, or any combination of them, may perform actions of detecting, identifying, sending, creating, and/or mapping. Accordingly, these circuits and/or devices, or any combination of them, may be considered as non-limiting examples of means for detecting, means for identifying, means for sending, means for creating, and/or means for mapping.

The network communication circuit 1002, for example, may be adapted to communicate with an application server and a communication network. The network communication circuit 1002 may include a first input/output module/circuit/function 1008 for communication with a serving gateway device and a second input/output module/circuit/function 1010 for communication with a packet data network. In some implementations, the first input/output module/circuit/function 1008 and the second input/output module/circuit/function 1010 may be the same input/output module/circuit/function. The first input/output module/circuit/function 1008 may handle multiple IP flows established on multiple bearers or data flows. The second input/output module/circuit/function 1010 may handle multiple IP flows with multiple servers on the packet data network. This list is non-limiting. The same or other input/output modules/circuits/functions may interface with other aspects of the core network, such as one or more PCRFs as known to those of skill in the art. The network communication circuit (the communication circuit) may be adapted to communicate with an application server and a communication network. A processing circuit 1004 may be coupled to the communication circuit.

The processing circuit 1004 may include or implement one or more processors, application specific processors, hardware and/or software modules, etc., that are adapted to support validation and/or mapping of downlink data packets that include network access tokens. For example, the processing circuit 1004 may be configured to detect a trigger associated with a device. The processing circuit 1004 may be configured to obtain a traffic network policy associated with an application service, responsive to detecting the trigger, obtain a network access token based on the traffic network policy, the network access token facilitating validating and/or mapping a downlink data packet obtained at the gateway device in user-plane traffic that is destined for the device, and send the network access token to an entity in control-plane signaling. By way of further example, a network access token (also referred to herein as a "DL token") obtaining module/circuit/function 1012 may be adapted to obtain (e.g., derive, generate, compute, etc.) network access tokens in accordance with aspects described herein, including derive network access tokens based on an unshared secret key that may be stored in the memory/storage device 1006. By way of another example, a connection identification (Connection ID) obtaining module/circuit/function 1014 may be adapted to obtain (e.g., derive, generate, compute, etc.) a connection identifier based on a secret key. The Connection ID may be used to identify a device initiated connection. By way of yet another example, a decision and processing module/circuit/function 1016 may be adapted to detect/decide if downlink data packets received from an application server, include network access tokens and if so, may be further adapted to pass the received packets to a cryptographic validation and/or mapping module/circuit/function 1018. The decision and processing module/circuit/function 1016 may be further adapted to pass received packets that do not include network access tokens to a service data flow filter bank (e.g., external to the processing circuit 1004). By way of still another example, a cryptographic validation/verification module/circuit/function 1030 may be adapted to validate/verify network access tokens received, for example, from application servers. This list is non-limiting.

The memory/storage device 1006 may be adapted to include network access token obtaining instructions 1020, Connection ID obtaining instructions 1022, decision and processing instructions 1024, cryptographic validation and/or mapping instructions 1026, cryptographic validation/verification instructions 1028, key (e.g., shared and/or unshared secret key) storage and instructions 1032, and Connection ID storage 1034. This list is non-limiting.

Communication between network communication circuit 1002, processing circuit 1004, memory/storage device 1006, and other components of exemplary gateway device 1000 may be through a communication bus 1036.

Exemplary Method Operational at a Gateway Device—Network Access Token Setup

Figure 11:
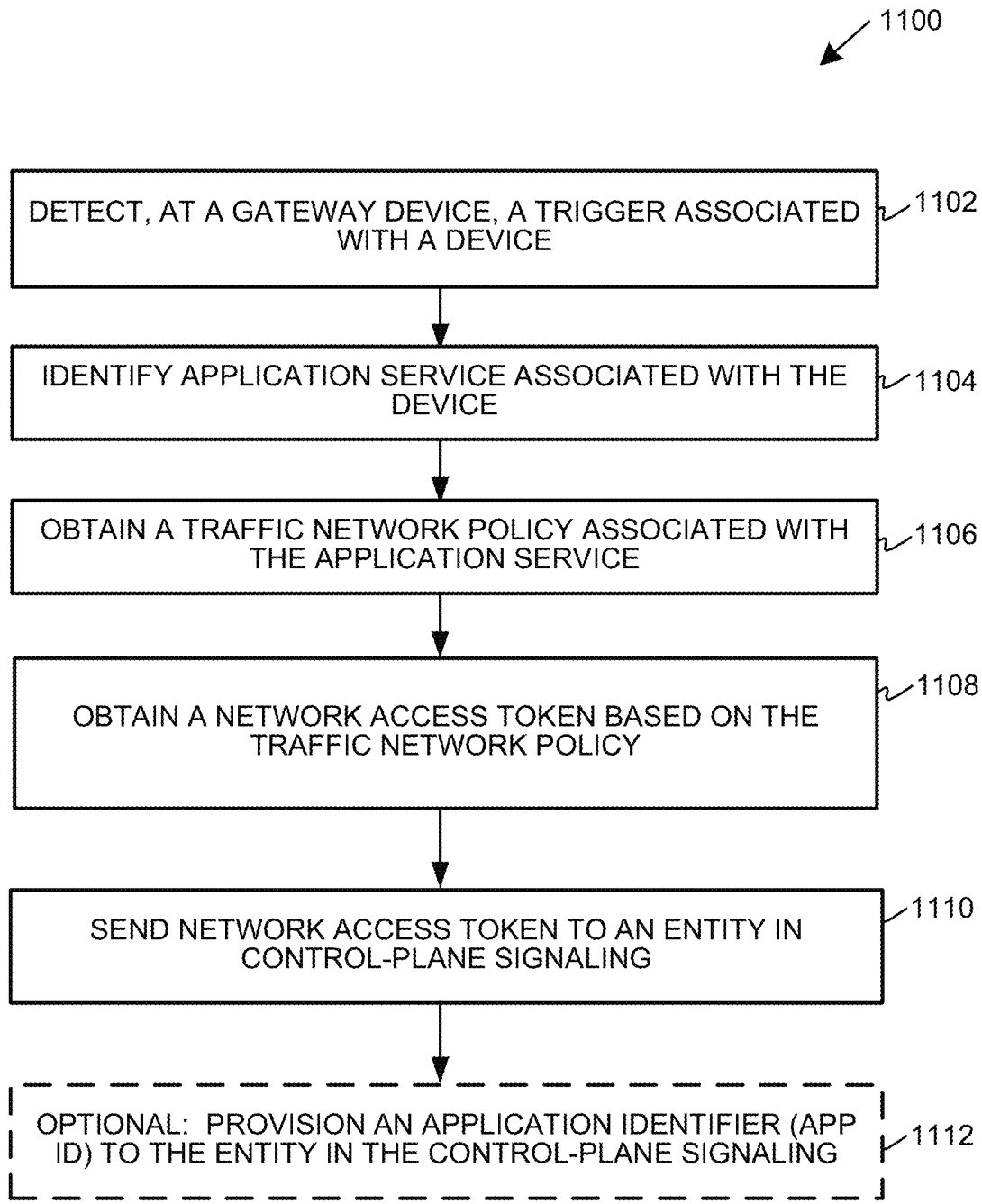
FIG. 11 is a flowchart of an exemplary method of network access token setup implemented in the control-plane in accordance with aspects described herein.

FIG. 11 is a flowchart of an exemplary method 1100 of network access token setup implemented in the control-plane in accordance with aspects described herein. According to the exemplary method 1100, a gateway device (e.g., a packet data network gateway device, P-GW) can obtain (e.g., derive, generate, compute, partially compute, etc.) a network access token and send that network access token to a first control-plane entity such as a PCRF. A second control-plane entity such as an application function may obtain the network access token from the first control-plane entity. The first and second control-plane entities may obtain the network access token in the control-plane, via control-plane signaling according to aspects described herein. A packet data network gateway device (P-GW) is referred to herein for exemplary purposes.

In one aspect, the exemplary method 1100, operational at a gateway device, may include detecting, at the gateway device, a trigger associated with a device 1102. In some aspects, the gateway device may be a packet data network gateway device (P-GW). The trigger may be present in control-plane signaling.

By way of example, the trigger may include obtaining a control-plane message to cause the gateway device to perform one or more of obtaining the traffic network policy associated with an application service, obtaining the network access token based on the traffic network policy, and/or sending the network access token to an entity (e.g., a PCRF, an AF) in control-plane signaling. In one implementation, the control-plane message may include an explicit command (or request or instruction) to perform one or more of obtaining the traffic network policy associated with an application service, obtaining the network access token, and/or sending the network access token to the entity in control-plane signaling. In one implementation, the control-plane message may include an implicit command (e.g., one or more messages or data that, individually or in combination, represent an implicit command, an implicit request, or an implicit instruction) to perform one or more of obtaining the traffic network policy associated with an application service, obtaining the network access token based on the traffic network policy, and/or sending the network access token to the entity in control-plane signaling. In one implementation, the control-plane message may be associated with one or more of a bearer setup message, a bearer activation message, and/or a bearer modification message. In one implementation, the control-plane message may be a create session request.

By way of example, the trigger may include obtaining, at the gateway device, a first data packet sent from the device that is destined for an application service. In some implementations, the trigger may include obtaining, at the gateway device, a data packet from the device (e.g., an uplink data packet, uplink data traffic) that is associated with an unknown application service. In some implementations, the trigger may include obtaining, at the gateway device, a data packet from the device that does not match an application service associated with, or previously associated with, the device. In other words, the trigger may include obtaining, at the gateway device, a data packet from the device that is not associated with an application service previously associated with the device.

By way of further example, the trigger may include receiving a PDN connectivity request from a device. The PDN connectivity request, for example, could occur during bearer setup, activation, and/or modification, or in networks where "bearers" per se are not defined or not used, during data flow setup, activation, and/or modification. In other aspects, an explicit command, an explicit request, or an explicit instruction may be embedded in an existing control-plane signaling message received by the P-GW. For example, an explicit command, an explicit request, or an explicit instruction may be included with a create session request message.

In one aspect, the implicit command, the implicit request, or the implicit instruction may be recognized, for example, from receipt of a pre-defined message at the P-GW. For example, a processing circuit of a P-GW may be configured/programmed to detect a trigger, where the trigger is receipt of a pre-defined message. One example of such a pre-defined message may be the create session request message. Other messages may be pre-defined for the same purpose. Receipt of such a pre-defined message could therefore be the trigger that implicitly represents a command, a request, or an instruction to obtain (e.g., derive, generate, compute, partially compute, etc.) and send a network access token in control-plane signaling. The network access token may then be used to validate and/or map downlink data packets in data transmissions sent from an application server to a device via a gateway device (e.g., P-GW).

In another aspect, an implicit command, an implicit request, or an implicit instruction may be recognized, for example, from receipt of a first control-plane signaling message from a given device. In still another aspect, the implicit command, an implicit request, or an implicit instruction may be recognized when control-plane signaling associated with a specific App ID is obtained, where, for example, a node identified by the App ID employs network access tokens.

Returning to FIG. 11, after the gateway device detects the trigger associated with the device 1102, the gateway device may identify an application service associated with the device 1104. Identifying the application service associated with the device may be responsive to detecting the trigger. The gateway device may obtain a traffic network policy associated with an application service 1106. Obtaining the traffic network policy associated with the application service may be responsive to detecting the trigger. In some aspects, the traffic network policy associated with an application service may be obtained from a PCRF (332, FIG. 3). In some aspects, the traffic network policy associated with an application service may be obtained from (or derived by including data from) an SPR (334, FIG. 3) of a PCRF (332, FIG. 3).

The P-GW may then obtain (e.g., derive, generate, compute, partially compute, etc.) a network access token (also referred to herein as a "DL token") based on the traffic network policy 1108. Obtaining the network access token based on the traffic network policy may be responsive to detecting the trigger. The network access token may be used in a process of validating and/or mapping a downlink data packet to be received at the gateway device in user-plane traffic.

The P-GW may obtain the network access token using, for example, data obtained from the traffic network policy. It should be understood, however, that the data used to obtain the network access token is not intended to be limited to the data obtained from the traffic network policy. For example, as exemplified in the aspects described herein, data used to obtain the network access token may include data obtained from packet(s) comprising the trigger (e.g., create session request) and data stored/derived on the P-GW (e.g., $K_{P\text{-}GW}$, KeyID).

As described above, the network access token may be derived using a function (e.g., a cryptographic function) with a set of input data including, for example, a secret key obtained by the gateway device. In some aspects, only the gateway device (e.g., the P-GW that derived the secret key) may know the secret key (e.g., $K_{P\text{-}GW}$, FIG. 6). The set of input data may further include a policy identifier, server (e.g., application server) Internet Protocol (IP) address, server port number, destination IP address, destination port number, protocol identifier (Proto), and/or an application identifier (App ID). Additional or alternate input data are permissible and may include, but are not limited to, priority and/or a quality of service class identifier (QCI), a key identifier (KeyID) that identifies the secret key used to obtain the network access token, and a key parameter index (KPI) that defines fields used for network access token derivation or defines a list of input parameters used to derive the network access token.

In one aspect, the key identifier (KeyID) may define the secret key (e.g., $K_{P\text{-}GW}$) used for network access token derivation. The key identifier may change periodically or in accordance with an instructions from the P-GW. In some aspects, a P-GW may have multiple keys for obtaining (e.g., deriving, generating, computing, requesting, receiving, acquiring, accepting, procuring, taking, collecting, getting, taking delivery or receipt of, being given, gaining access to, coming into possession of) network access tokens. If a P-GW changes the network access token key, two keys may be valid at the same time. Accordingly, the key identifier can be used to avoid immediate network access token revocation in such a scenario.

In one aspect, the network access token may be a concatenation of the key identifier (KeyID), the key parameter index (KPI), a policy identifier, and an output of a function used in connection with derivation of the network access token. In some aspects, the function may be a secure hash function such as a secure hash algorithm (SHA)-1, SHA-2, or SHA-3. In other aspects, the function may be a hash message authentication code (HMAC) function. In still other aspects, the function may be a message authentication code (MAC) derivation function. The MAC derivation function may include a cipher block chaining message authentication code (CBC-MAC) function, a cypher-based MAC (CMAC) function, or a Galois message authentication code (GMAC) function.

One feature of the network access token may be that it can be specific to a particular device and/or application service. In other words, the network access token may be linked to (e.g., bound to) one (e.g., a specific, a given) device and/or one application service. As such, the network access token may identify one device and/or may identify one application service. Accordingly, the network access token may be considered a "per-device network access token" linked to one application service. In another aspect, the network access token may be linked/bound to an application server, an application service, and a device. According to one exemplary aspect, the P-GW may obtain one network access token for each of the one or more application service(s) identified for a given device. A P-GW can map a downlink data packet that includes a network access token to the device and/or application service linked to the network access token without a need to use SFT/TFT templates.

In one aspect, a network access token and an application identifier (App ID) may be sent to an application function. In one implementation, the network access token and the App ID may be sent to the application function in a network access token provisioning message (e.g., an access grant message). The App ID may identify an application server, application service, or application function that is a destination of the network access token. In such aspects, or in any other aspect, the network access token may be linked (e.g., bound) to a thing such as an application server, an application service, an App ID, and/or a device. As used herein, the terms "linked" and/or "bound" indicate that the network access token (also referred to herein as a "DL token") may be obtained (e.g., derived, generated, computed, etc.) using a function that includes, but is not limited to, the named thing (or some identifier of the thing). By way of example, a network access token may be linked or bound to an application service and a device (i.e., the network access token is specific to an identified application service and an identified device). The equation used to obtain (e.g., derive, generate, compute, etc.) the network access token may include parameters in addition to those that specifically identify the application service and/or device. It will be understood that the parameters recited herein (e.g., KeyID, KPI, Policy ID, $K_{P-GW}$, $IP_S$, $IP_C$, $P_S$, $P_C$, Proto, App ID, priority, quality of service class identifier (QCI)), in connection with examples of equations used to obtain (e.g., derive, generate, compute, etc.) a network access token are not intended to be exhaustive or limiting. Additionally, the parameters recited herein, in connection with examples of equations used to obtain a network access token, are not intended to identify a minimum number of parameters.

After obtaining the network access token based on the traffic network policy 1108, the gateway device may send the network access token to an entity in control-plane signaling 1110. In one implementation, the entity may be a policy and charging rules function (PCRF) and the network access token may be sent to the PCRF in the control-plane signaling. In one implementation, the entity may be an application function, and the network access token is sent to the application function in the control-plane signaling. In one implementation, the entity may be an application function, and the network access token is sent to the application function via a policy and charging rules function (PCRF) in the control-plane signaling.

In one aspect, the network access token may be sent to the entity in control-plane signaling in one packet. In one aspect, the network access token may be sent to the entity in control-plane signaling in a plurality of packets (e.g., the network access token may be distributed among the plurality of packets).

Optionally, the gateway device may obtain an application identifier, as described above, and send the application identifier (App ID) to the entity in control-plane signaling 1112.

Figure 12:
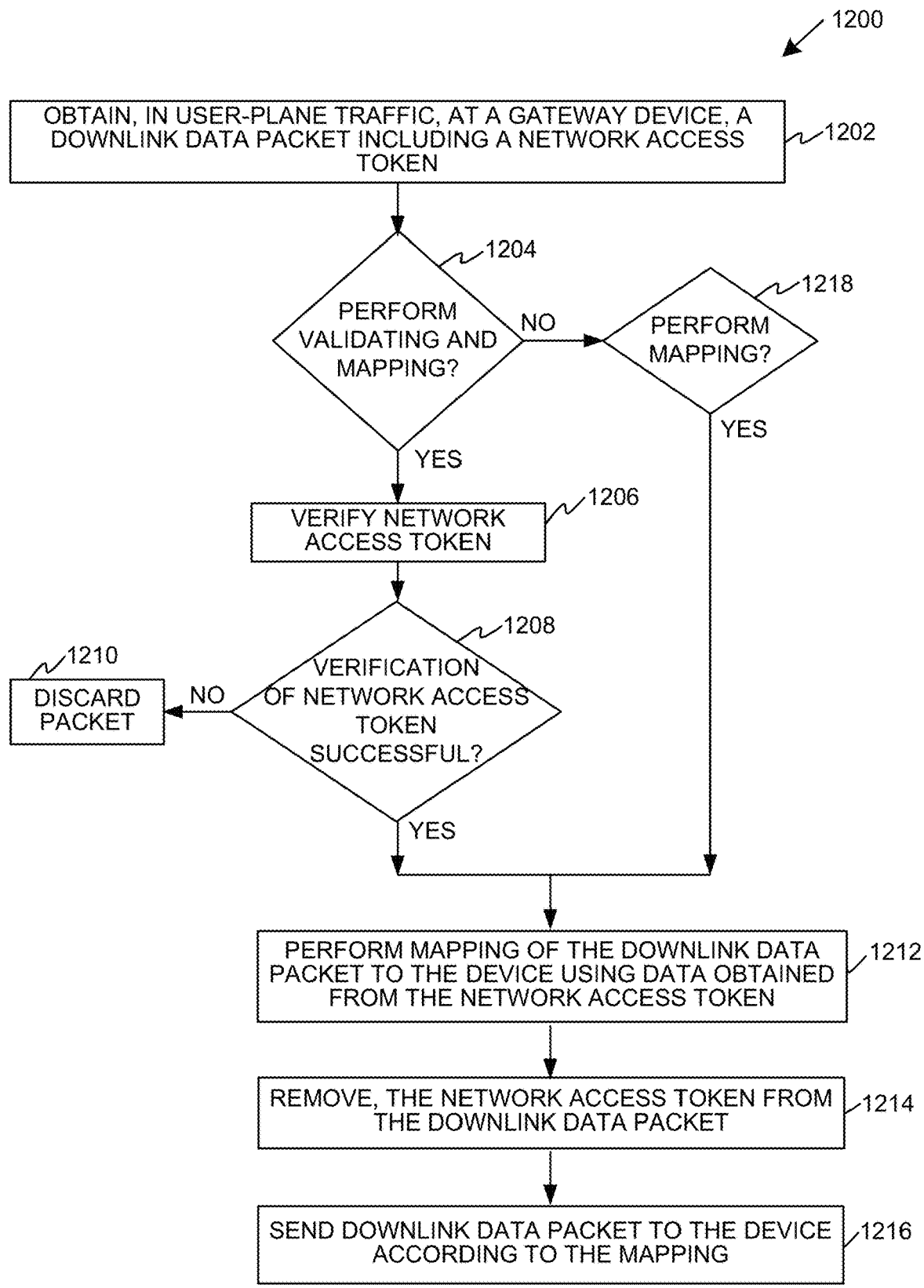
FIG. 12 is a flowchart of an exemplary method of policy enforcement using a network access token that is implemented in the user-plane in accordance with aspects described herein.

Exemplary Method Operational at a Gateway Device—Enforcement Implemented with Network Access Token FIG. 12 is a flowchart of an exemplary method 1200 of policy enforcement using a network access token that is implemented in the user-plane in accordance with aspects described herein. The exemplary method 1200 may be a stand-alone method or may be appended to the method of FIG. 11. In other words, the exemplary method 1200 of FIG. 12 may be preceded by the exemplary method of FIG. 11. In still other words, prior to performing the method according to FIG. 12, the gateway device may have sent a network access token to a first control-plane entity (e.g., a PCRF) in control-plane signaling, a second control-plane entity (e.g., an application function) may have obtained the network access token from the first control-plane entity in control-plane signaling, an application server may have obtained the network access token from the second control-plane entity. The application server may have created (e.g., constructed, compiled, formed, assembled) a downlink data packet including the network access token and sent the downlink data packet including the network access token to a device via the gateway device. It may be at this juncture where the exemplary method according to FIG. 12 may be implemented.

The exemplary method 1200 may be used, for example, to efficiently enforce downlink policies by using network access tokens received at a gateway device in user-plane signaling, where the network access tokens were sent by the gateway device to application functions in control-plane signaling.

The exemplary method 1200 may be operational at a gateway device (e.g., P-GW). In one aspect, the method may include obtaining, in user-plane traffic, at the gateway device, a downlink data packet including a network access token 1202. In some implementations, the method may further include performing one or more processes including validating the downlink data packet (e.g., by verifying the network access token) and/or mapping the downlink data packet to the device using data obtained from the network access token. The gateway device may determine if it is to perform the processes of validating and/or mapping 1204.

If the gateway device determines that it is to perform the processes of validating and mapping, the gateway device may verify the network access token 1206. The gateway device may determine if the verification of the network access token was successful 1208. If the verification of the network access token was not successful, the gateway device may discard the downlink data packet 1210. If the verification of the network access token was successful, the gateway device may perform mapping of the downlink data packet to the device using data obtained from the network access token 1212. The gateway device may remove the network access token from the downlink data packet 1214. The gateway device may then send the data packet to the device according to the mapping 1216. Removal of the network access token from the downlink data packet may be performed before or after verification of the network access token. In some implementations, removal of the network access token may be optional.

Likewise, if the gateway device determines that it is not to perform the processes of validating and mapping 1204, the gateway device may determine if it is to perform the process of mapping 1218. If the gateway device determines that it is to perform the process of mapping (e.g., without verifying the network access token), the gateway device may perform mapping of the downlink data packet to the device using data obtained from the network access token 1212. The gateway device may remove the network access token from the downlink data packet 1214. Removal of the network access token from the downlink data packet may be performed before or after mapping. In some implementations, removal of the network access token is optional. The gateway device may then send the data packet to the device according to the mapping 1216.

Verification of a first network access token may be made, for example, using data obtained from the downlink data packet that included the first network access token. The gateway device may obtain (e.g., derive, generate, compute, etc.) a second network access token based on data obtained from the downlink data packet. The gateway device may verify the first network access token included with the downlink data packet by comparing it to the second network access token. Because the gateway device obtained the second network access token based on data obtained from the downlink data packet (e.g., and, if the downlink data packet is authentic, the obtained data should be the same as the data used to create the first network access token), the second network access token should presumably be equal to the first network access token. The gateway device may compare the first network access token to the second network access token, wherein if the first network access token and the second network access token are equal, the verification of the network access token is successful. That is, if a value of the second network access token matches (e.g., is equal to, equivalent to) a value of the first network access token, then verification of the first network access token is successful. Moreover, if a value of the second network access token matches (e.g., is equal to, equivalent to) a value of the first network access token, then it may be concluded that validation of the downlink data packet (that included the first network access token) is successful.

Validation of downlink data packets at the gateway device may be desirable, for example, to ensure that a device only receives packets from authorized application services and/or to apply a traffic network policy and/or a specific packet handling policy (e.g., QoS policy) to the downlink data packet being validated. Validation may include verifying a destination address, the destination address and a port number, or a destination address prefix of each packet. Validation may additionally or alternatively include verifying a source address, the source address and a port number, or a source address prefix of each packet. As known to those of skill in the art, a destination address and a source address each may be comprised of two parts: a prefix part and a suffix part. Verifying the source address prefix of each packet may be useful in cases where a policy applies to the source domain instead of a specific server (i.e., an application service may not be tied to a specific server (e.g., machine)). Verifying the source address of each packet may be useful for anti-spoofing (e.g., by preventing packets from an unauthorized application service from fooling the cellular communication network by appearing to come from an authorized application service). Additionally, validation of downlink data packets may require verifying a protocol number of each packet, and applying access and rate controls (e.g., QoS policies may dictate certain access and rate controls) to each downlink data packet.

Furthermore, the P-GW may use the network access token included with a downlink data packet to map the downlink data packet to a device associated (e.g., linked, bound) with the network access token. Mapping may be accomplished using data (e.g., mapping data) obtained from the network access token. The data can be obtained from the network access token by, for example, decrypting the network access token. Data included in a network access token (e.g., data used derive, generate, compute the network access token) may include, for example, an identifier (e.g., KeyID) of a key (e.g., $K_{P-GW}$) used for obtaining (e.g., deriving, generating, computing, etc.) the network access token, a key parameter index (e.g., KPI) that may define fields used for network access token derivation or define a list of input parameters used to derive the network access token, a policy identifier (e.g., Policy ID) that may define a traffic network policy, a specific packet handling policy, and/or, a flow treatment policy (e.g., QoS policy, mapping the flow to a data flow or bearer, and other aspects of flow treatment policies as understood by those of skill in the art), a server (e.g., application server) IP address (e.g., $IP_S$), a client (e.g., chip component, client device, user equipment) IP address (e.g., $IP_S$), a server port number (e.g., $P_S$), a client port number (e.g., $P_C$), a protocol number or identifier (e.g., Proto), and an application identifier (e.g., App ID). Using the data obtained from the network access token, the gateway device can map the downlink data packet that included the network access token to a device via a data flow or bearer (e.g., an IP-CAN bearer) that complies with requirements set forth in the traffic network policy associated with an application service. Mapping may be facilitated, for example, by the identification of the data flow or bearer in a Policy ID field in the network access token.

Figure 13:
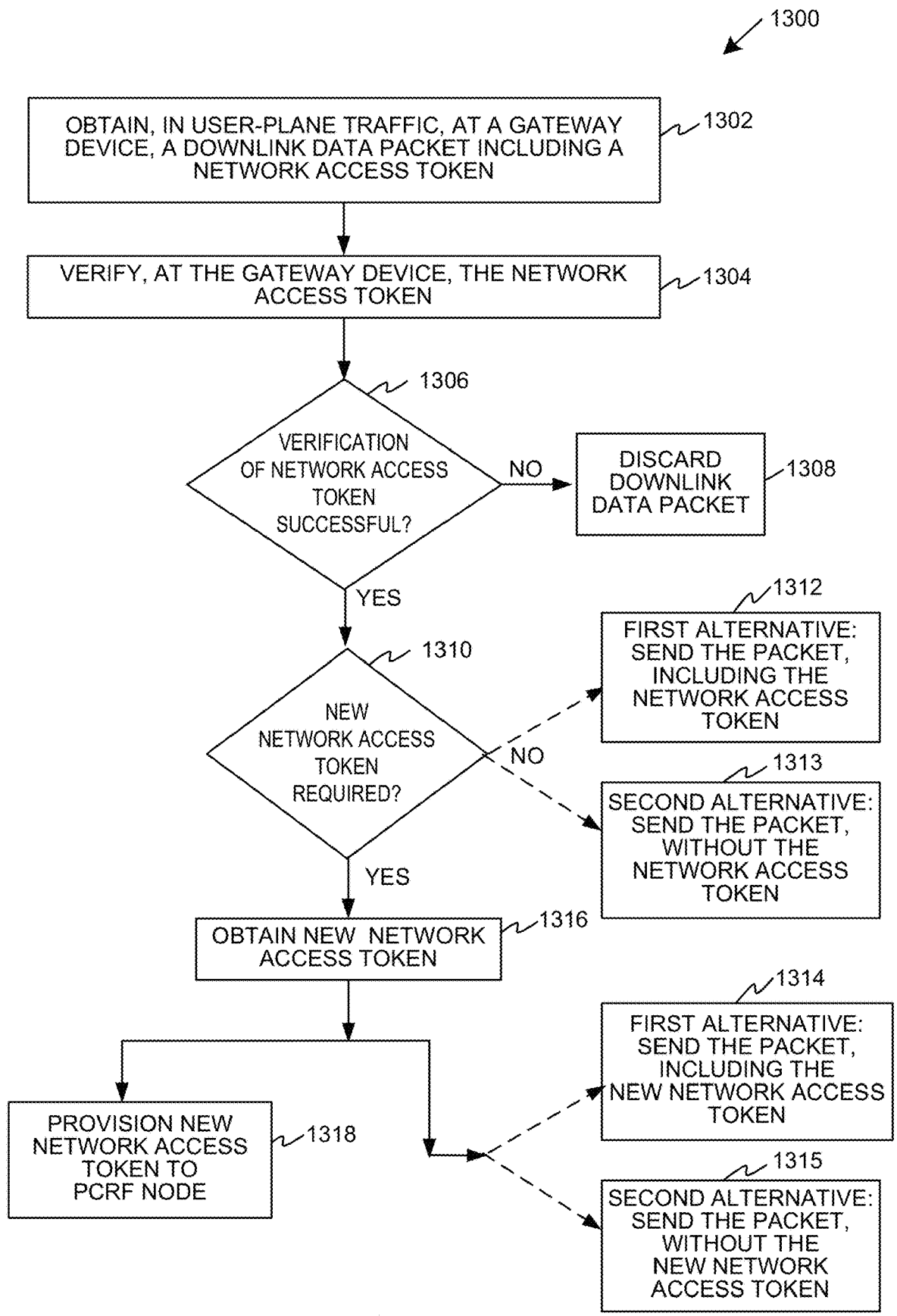
FIG. 13 is a flowchart of another exemplary method of policy enforcement using a network access token that is implemented in the user-plane in accordance with aspects described herein.

FIG. 13 is a flowchart of another exemplary method 1300 of policy enforcement using a network access token that is implemented in the user-plane in accordance with aspects described herein. The exemplary method 1300 may be used, for example, to efficiently enforce downlink policies by using network access tokens received at a gateway device in user-plane signaling, where the network access tokens were sent by the gateway device to application functions in control-plane signaling.

The exemplary method 1300 may be operational at a gateway device (e.g., P-GW). In one aspect, a downlink data packet including a network access token may be obtained in user-plane traffic at the gateway device 1302. A module/circuit/function at the gateway device may verify the network access token 1304. Verification may take place as described above. Verification of the network access token may be determined to be successful or not successful 1306. If verification of the network access token was not successful, the downlink data packet may be discarded 1308. If verification of the network access token was successful, a determination of whether a new network access token is needed may occur 1310.

A new network access token may be needed, for example, because network access tokens may be valid only under certain conditions. For example, in some aspects, network access tokens may change periodically. In another aspect, the network access token may be subject to expiration based on a pre-determined time since derivation of the network access token. The network access token might cease being valid upon expiry of the pre-determined time. In some aspects, a network access token may be subject to expiration based on limitations placed on a key (e.g., $K_{P-GW}$) used to derive the network access token. For example, the key used to derive the network access token may be replaced by a new key (e.g., $K''_{P-GW}$). Replacement of an existing key (e.g., $K'_{P-GW}$) with a new and different key (e.g., $K''_{P-GW}$) may be due, for example, to a pre-determined timed expiration of the existing key, a key identifier, or some other event. When a network access token is determined to no longer be valid, or in some other way no longer desired for use as a network access token, the gateway device may obtain a new network access token 1316 to replace the present network access token.

The gateway device may make a decision to obtain (e.g., derive, etc.) a new network access token. New network access token setup may precede as described above. Those of skill in the art will understand that, at least one parameter (among the plurality of parameters used to derive a network access token presently in use) may be required to be changed, lest the new network access token be identical to the network access token presently in use. Change of a parameter may include, but is not limited to, changing the location of the parameter in a concatenation of a plurality of parameters, changing a value of a parameter (e.g., the value of the parameter may be a function of time), and/or substituting a first parameter for a second parameter, where the second parameter is different from the first parameter.

If a new network access token is not required, according to a first alternative, the downlink data packet including the network access token may be sent to its destination 1312. According to a second alternative, the downlink data packet without the network access token may be sent to its destination 1313. According to both alternatives, the destination of the downlink data packet is the device.

If a new network access token is required, the gateway device may obtain the new network access token 1316 according to, for example, previously described methods. The new network access token may be sent to a PCRF associated with the gateway device 1318. An application server sending additional downlink data packets to the gateway device may obtain the new network access token, for example, from the PCRF via an application function.

In addition, according to a first alternative, the downlink data packet, including the new network access token, may be sent to its destination 1314. According to a second alternative, the downlink data packet, without the new network access token, may be sent to its destination 1315. According to both alternatives, the destination of the downlink data packet is the device.

In some aspects, another entity (e.g., a device or an application server) may make the decision to obtain (e.g., derive, etc.) a downlink token. For example, in one aspect, the device may determine that it needs a downlink token. In another aspect, an application server may determine that it needs a downlink token. If another entity (e.g., a device) requires a downlink token, that downlink token should be independent of the network access token of the gateway device. The downlink token determined to be needed by the other entity may be derived and sent to the application server by the other entity (e.g., the device). Note that a device cannot force or require a gateway device (e.g., a P-GW) to change a network access token obtained (derived, etc.) by the P-GW using the key $K_{P-GW}$ because doing so would invalidate all network access tokens associated with other devices and service flows.

Exemplary Application Server

Figure 14:
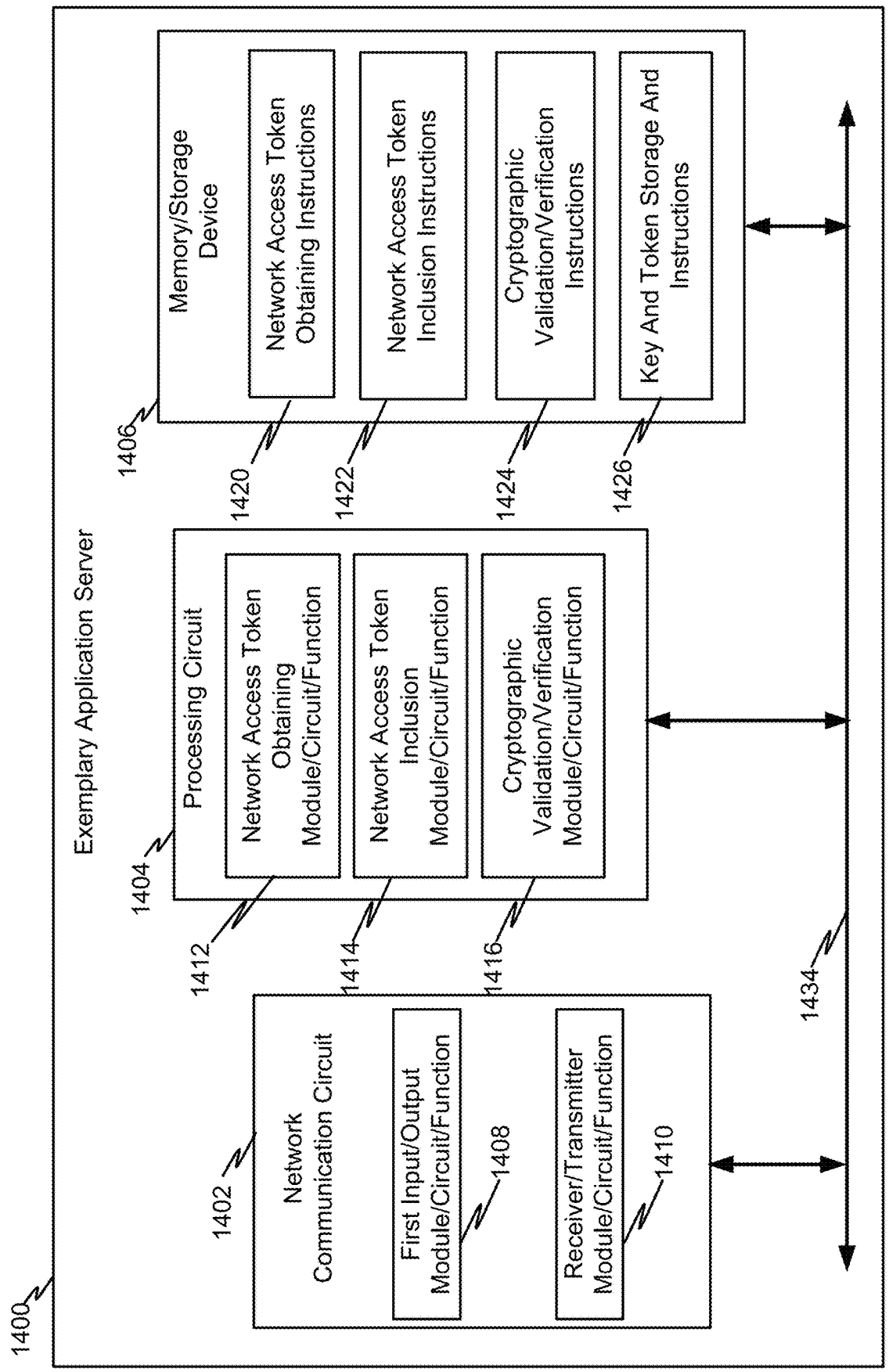
FIG. 14 is a block diagram illustrating an exemplary application server adapted to support validation and/or mapping of downlink data packets according to aspects described herein.

FIG. 14 is a block diagram illustrating an exemplary application server 1400 adapted to support validation and/or mapping of downlink data packets according to aspects described herein. In one example, the exemplary application server 1400 may include a network communication circuit 1402, a processing circuit 1404 coupled to the network communication circuit 1402, and a memory/storage device 1406 coupled to the processing circuit 1404. This list is non-limiting. These circuits and/or devices, or any combination of them, may perform actions of detecting, identifying, sending, creating, and/or mapping. Accordingly, these circuits and/or devices, or any combination of them, may be considered as non-limiting examples of means for detecting, means for identifying, means for sending, means for creating, and/or means for mapping.

The network communication circuit 1402, for example, may be adapted to communicate with a communication network. The network communication circuit 1402 may include a first input/output module/circuit/function 1408 for communication with a gateway device (e.g., a P-GW). The network communication circuit 1402 may include a receiver/transmitter module/circuit/function 1410 for communication with additional entities. This list is non-limiting.

The processing circuit 1404 may include or implement one or more processors, application specific processors, hardware and/or software modules, etc., that are adapted to support network access token (also referred to herein as "DL token) related actions and/or operations. For example, the processing circuit 1404 may be configured to obtain a network access token linked to a device and linked to the application server and/or an application service. The processing circuit 1404 may be configured to create a downlink data packet destined for the device, map the downlink data packet to the network access token, include the network access token in the downlink data packet, and send the downlink data packet including the network access token to the device via a gateway device in user-plane traffic. Each of these actions and/or operations may be part of a process of validating and/or mapping a downlink data packet to be received at the gateway device in user-plane traffic, where the gateway device originally sent the network access token to the application server, directly or indirectly, in control-plane signaling. by way of further example, a network access token obtaining module/circuit/function 1412 may be adapted to obtain (e.g., derive, generate, compute, request, receive, acquire, accept, procure, take, collect, get, take delivery or receipt of, be given, gain access to, come into possession of, etc.) network access tokens that may be stored in the memory/storage device 1406 or may be adapted to obtain network access tokens from an application function associated with the exemplary application server 1400. By way of another example, a network access token inclusion module/circuit/function 1414 may be adapted to include (e.g., embed, associate, incorporate, add) network access tokens in downlink data packets forwarded to a gateway device. By way of still another example, a cryptographic validation/verification module/circuit/function 1416 may be adapted to validate/verify tokens received, for example, from devices. This list is non-limiting.

The memory/storage device 1406 may be adapted to include network access token handling instructions 1420, network access token including (e.g., embedding, associating) instructions 1422, cryptographic validation/verification instructions 1424, and key (e.g., shared and/or unshared secret key) storage and token (e.g., network access token) storage and instructions 1426. This list is non-limiting.

Communication between network communication circuit 1402, processing circuit 1404, memory/storage device 1406, and other components (not shown) of exemplary application server 1400 may be through a communication bus 1434.

Exemplary Method Operational at an Application Server

Figure 15:
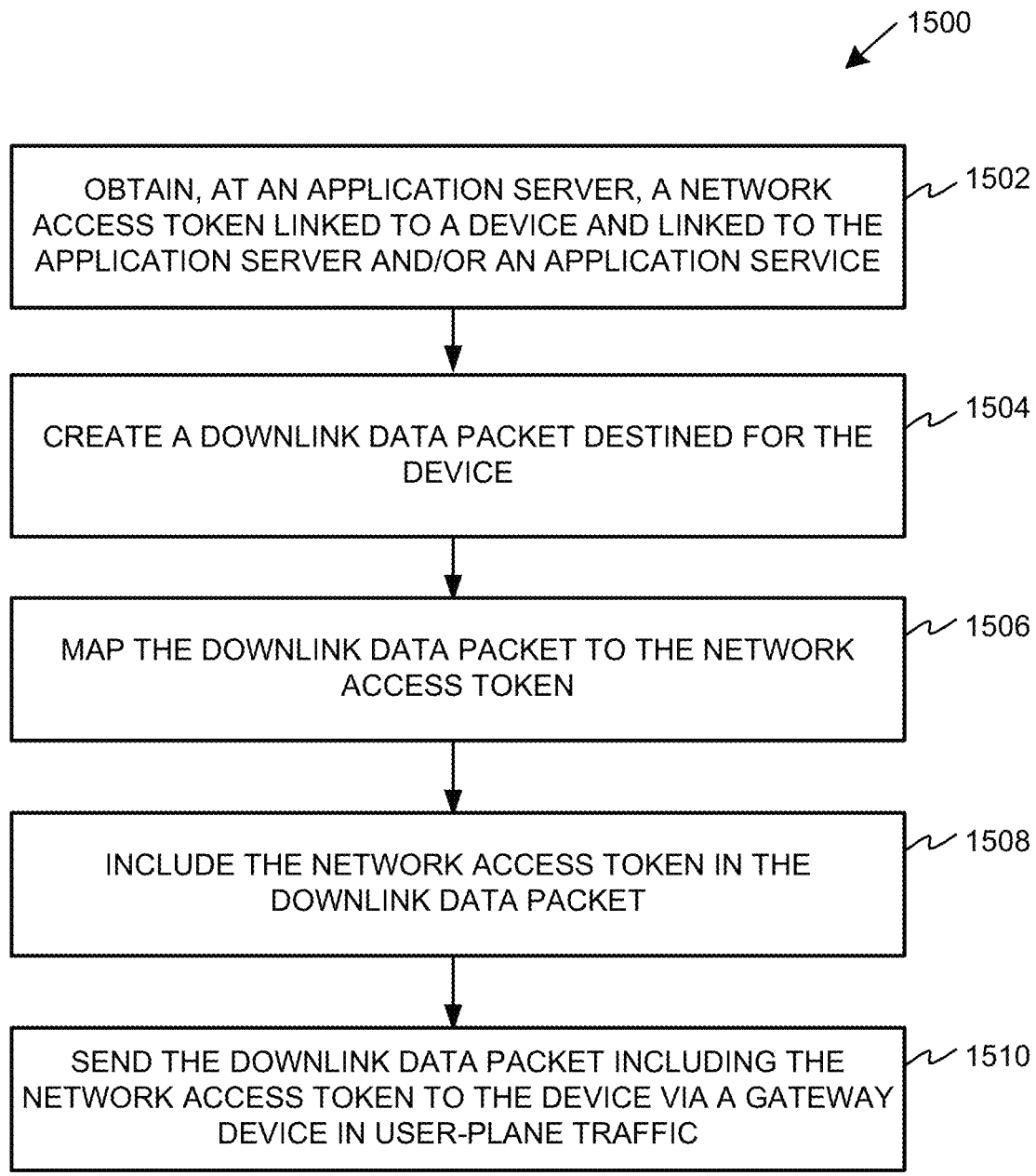
FIG. 15 is a flowchart of an exemplary method by which an application server obtains a network access token includes (e.g., embeds, associates) the network access token in a downlink data packet, and sends the downlink data packet to a device via a gateway device in a data transmission in accordance with aspects described herein.

FIG. 15 is a flowchart of an exemplary method 1500 by which an application server obtains a network access token includes (e.g., embeds, associates) the network access token in a downlink data packet, and sends the downlink data packet to a device via a gateway device in a data transmission in accordance with aspects described herein. The exemplary method 1500 may be operational at the application server.

The exemplary method 1500 may include obtaining, at the application server, a network access token linked to a device and linked to the application server and/or an application service 1502. The exemplary method 1500 may also include creating a downlink data packet destined for the device 1504. This may be followed by mapping the downlink data packet to the network access token 1506. It should be noted however that the actions described in the exemplary method 1500 may be performed in any order. The exemplary method 1500 may further include having the application server include (embed, associate) the network access token in the downlink data packet 1508. The exemplary method 1500 may then entail sending the downlink data packet including the network access token to the device via a gateway device in user-plane traffic 1510.

According to some aspects, the network access token may be obtained in control-plane signaling from the gateway device. The network access token may be obtained in the control-plane signaling either directly or indirectly from the gateway device. For example, the network access token may be obtained at an application function associated with the application server in control-plane signaling from the gateway device. Furthermore, the network access token that was obtained at the application function may have been obtained via an interface (e.g., an Rx interface) with a policy and charging rules function (PCRF) associated with the gateway device. In general, however, according to some aspects the network access token may be obtained from the gateway device in control-plane signaling. The application service may be hosted on the application server. In some implementations, the network access token may be included in one or more of: an Internet Protocol (IP) header, wherein the IP header is an IP Options Field for IPv4; an Internet Protocol (IP) header, wherein the IP header is an IP extension header for IPv6; a Transmission Control Protocol (TCP) header; a Secure Socket Layer (SSL) header; a Transport Layer Security (TLS) record header; a shim header between an Internet Protocol (IP) header and a Transmission Control Protocol/User Datagram Protocol (TCP/UDP) header; and/or a Hypertext Transfer Protocol (HTTP) header.

Exemplary Device

Figure 16:
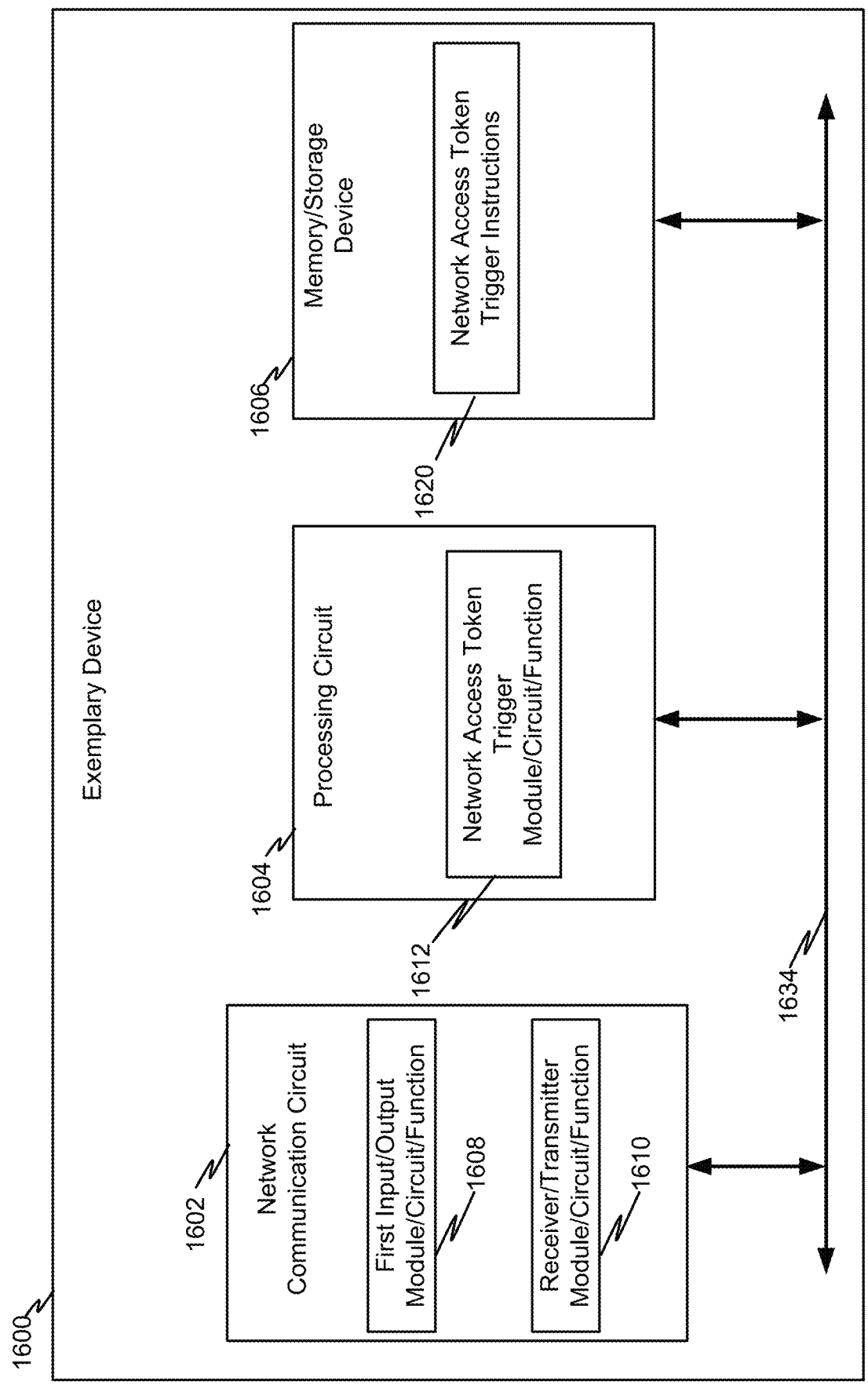
FIG. 16 is a block diagram illustrating an exemplary device adapted to support validation and/or mapping of downlink data packets in accordance with aspects described herein.

FIG. 16 is a block diagram illustrating an exemplary device 1600 adapted to support validation and/or mapping of downlink data packets in accordance with aspects described herein. In one example, the exemplary device 1600 may include a network communication circuit 1602, a processing circuit 1604 coupled to the network communication circuit 1602, and a memory/storage device 1606 coupled to the processing circuit 1604. This list is non-limiting. These circuits and/or devices, or any combination of them, may perform actions of detecting, identifying, sending, creating, and/or mapping. Accordingly, these circuits and/or devices, or any combination of them, may be considered as non-limiting examples of means for detecting, means for identifying, means for sending, means for creating, and/or means for mapping.

The network communication circuit 1602 may include a first input/output module/circuit/function 1608 for input/output operations with a user. The network communication circuit 1602 may include a receiver/transmitter module/circuit/function 1610 for wireless communication with an access node (e.g., eNodeB). This list is non-limiting.

The processing circuit 1604 may include or implement one or more processors, application specific processors, hardware and/or software modules, etc., that are adapted to support efficient policy enforcement of downlink data traffic using network access tokens sent to application functions in control-plane signaling. The processing circuit 1604, and therefore the exemplary device 1600, may support a process of efficient policy enforcement that includes validation and/or mapping of downlink data packets that include network access tokens in accordance with aspects described herein. For example, a network access token trigger module/circuit/function 1612, or more generally the processing circuit 1604, or even more generally the exemplary device 1600, may be adapted to create (e.g., construct, compile, form, assemble) a control-plane message to cause a trigger to be received at a gateway device. A network access token trigger module/circuit/function 1612, or more generally the processing circuit 1604, or even more generally the exemplary device 1600, may be further adapted to send the control-plane message in control-plane signaling, where the detecting the trigger may cause the gateway device to perform one or more of obtaining the traffic network policy associated with an application service, obtaining a network access token based on the traffic network policy, and/or sending the network access token to an entity (e.g., an AF, a PCRF) in control-plane signaling.

The memory/storage device 1606 may be adapted to include network access token requesting instructions 1620. This list is non-limiting.

Communication between network communication circuit 1602, processing circuit 1604, memory/storage device 1606, and other components (not shown) of the exemplary device 1600 may be through a communication bus 1634.

Specific implementations shown and described are only examples and should not be construed as the only way to implement the present disclosure unless specified otherwise herein.

One or more of the components, acts, features and/or functions described herein and illustrated in the drawings may be rearranged and/or combined into a single component, act, feature, or function or embodied in several components, acts, features, or functions. Additional elements, components, acts, and/or functions may also be added without departing from the invention. The algorithms described herein may also be efficiently implemented in software. The algorithms described herein may also be efficiently implemented, included, and/or embedded in hardware.

In the description, elements, modules, circuits, and/or functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. For the most part, details concerning timing considerations and the like have been omitted where such details are not necessary to obtain a complete understanding of the present disclosure and are within the abilities of persons of ordinary skill in the relevant art.

Also, it is noted that the aspects may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals, including a single data signal.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Moreover, a storage medium may represent one or more devices for storing data, including read-only memory (ROM), random access memory (RAM), magnetic disk storage mediums, optical storage mediums, flash memory devices, and/or other machine-readable mediums, processor-readable mediums, and/or computer-readable mediums for storing information. The terms "machine-readable medium," "computer-readable medium," and/or "processor-readable medium" may include, but are not limited to non-transitory mediums such as portable or fixed storage devices, optical storage devices, and various other mediums capable of storing, containing, or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines, and/or devices.

Furthermore, aspects may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, elements, modules, circuits, functions, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, and/or any other such configuration. A general-purpose processor, configured for executing aspects described herein, is considered a special purpose processor for carrying out such aspects. Similarly, a general-purpose computer is considered a special purpose computer when configured for carrying out aspects described herein.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, elements, modules, circuits, functions, and/or algorithm steps described in connection with the aspects disclosed herein may be implemented as electronic hardware, computer software, or combinations of both. To clearly illustrate this interchangeability of hardware and software, various illustrative components, blocks, elements, modules, circuits, functions, and/or steps have been described above generally in terms of their functionality. Whether such functionality is implemented as hardware, software, or a combination thereof depends upon the particular application and design selections imposed on the overall system or network.

The various features of the invention described herein can be implemented in different systems or networks without departing from the invention. It should be noted that the foregoing aspects are merely examples and are not to be construed as limiting the invention. The description of the aspects is intended to be illustrative, and not to limit the scope of the claims. As such, the present teachings can be readily applied to other types of apparatuses and many alternatives, modifications, and variations will be apparent to those skilled in the art.

What is claimed is:

1. A method, operational at an application server, comprising:
   obtaining, at the application server, a network access token in control-plane signaling from a gateway device, the network access token linked to a device and linked to an application service;
   creating a downlink data packet destined for the device;
   mapping the downlink data packet to the network access token;
   including the network access token in the downlink data packet; and
   sending the downlink data packet including the network access token to the device via the gateway device in user-plane traffic.

2. The method of claim 1, wherein the network access token was obtained at an application function associated with the application server in control-plane signaling from the gateway device.

3. The method of claim 2, wherein the network access token was obtained at the application function via an interface with a policy and charging rules function (PCRF) associated with the gateway device.

4. The method of claim 1, wherein the network access token is further linked to the application server.

5. The method of claim 4, wherein the application service is hosted on the application server.

6. The method of claim 1, wherein the network access token is included in one or more of:
- a first Internet Protocol (I.P.) header, wherein the first I.P. header is an I.P. Options Field for IPv4;
- a second Internet Protocol (I.P.) header, wherein the second I.P. header is an I.P. extension header for IPv6;
- a Transmission Control Protocol (TCP) header;
- a Secure Socket Layer (SSL) header;
- a Transport Layer Security (T.L.S.) record header;
- a shim header between a third Internet Protocol (I.P.) header and a Transmission Control Protocol/User Datagram Protocol (TCP/UDP) header; and/or
- a Hypertext Transfer Protocol (HTTP) header.

7. An application server, comprising:
a communication circuit adapted to communicate with a communication network; and
a processing circuit coupled to the communication circuit, the processing circuit configured to:
  obtain a network access token in control-plane signaling from a gateway device, the network access token linked to a device and linked to an application service;
  create a downlink data packet destined for the device;
  map the downlink data packet to the network access token;
  include the network access token in the downlink data packet; and
  send the downlink data packet including the network access token to the device via the gateway device in user-plane traffic.

8. The application server of claim 7, wherein the processing circuit is further configured to obtain the network access token from an application function associated with the application server in control-plane signaling from the gateway device.

9. The application server of claim 8, wherein the processing circuit is further configured to obtain the network access token from the application function via an interface with a policy and charging rules function (PCRF) associated with the gateway device.

10. The application server of claim 7, wherein the network access token is further linked to the application server.

11. The application server of claim 10, wherein the application service is hosted on the application server.

12. The application server of claim 7, wherein the network access token is included in one or more of:
- a first Internet Protocol (I.P.) header, wherein the first I.P. header is an I.P. Options Field for IPv4;
- a second Internet Protocol (I.P.) header, wherein the second I.P. header is an I.P. extension header for IPv6;
- a Transmission Control Protocol (TCP) header;
- a Secure Socket Layer (SSL) header;
- a Transport Layer Security (T.L.S.) record header;
- a shim header between a third Internet Protocol (I.P.) header and a Transmission Control Protocol/User Datagram Protocol (TCP/UDP) header; and/or
- a Hypertext Transfer Protocol (HTTP) header.

13. A non-transitory machine-readable storage medium having one or more instructions stored thereon, which when executed by at least one processor causes the at least one processor to:
  obtain, at an application server, a network access token in control-plane signaling from a gateway device, the network access token linked to a device and linked to an application service;
  create a downlink data packet destined for the device;
  map the downlink data packet to the network access token;
  include the network access token in the downlink data packet; and
  send the downlink data packet including the network access token to the device via the gateway device in user-plane traffic.

14. The non-transitory machine-readable storage medium of claim 13 having one or more further instructions stored thereon, which when executed by the at least one processor causes the at least one processor to:
  obtain the network access token from an application function associated with the application server in control-plane signaling from the gateway device.

15. The non-transitory machine-readable storage medium of claim 14 having one or more further instructions stored thereon, which when executed by the at least one processor causes the at least one processor to:
  obtain the network access token from the application function via an interface with a policy and charging rules function (PCRF) associated with the gateway device.

16. The non-transitory machine-readable storage medium of claim 13, wherein the network access token is further linked to the application server.

17. The non-transitory machine-readable storage medium of claim 16, wherein the application service is hosted on the application server.

18. The non-transitory machine-readable storage medium of claim 13, wherein the network access token is included in one or more of:
- a first Internet Protocol (I.P.) header, wherein the first I.P. header is an I.P. Options Field for IPv4;
- a second Internet Protocol (I.P.) header, wherein the second I.P. header is an I.P. extension header for IPv6;
- a Transmission Control Protocol (TCP) header;
- a Secure Socket Layer (SSL) header;
- a Transport Layer Security (T.L.S.) record header;
- a shim header between a third Internet Protocol (I.P.) header and a Transmission Control Protocol/User Datagram Protocol (TCP/UDP) header; and/or
- a Hypertext Transfer Protocol (HTTP) header.

* * * * *